(12) United States Patent
Bidner et al.

(10) Patent No.: US 8,407,988 B2
(45) Date of Patent: *Apr. 2, 2013

(54) PARTICULATE FILTER REGENERATION IN AN ENGINE COUPLED TO AN ENERGY CONVERSION DEVICE

(75) Inventors: David Karl Bidner, Livonia, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

This patent is subject to a terminal disclaimer.

(21) Appl. No.: 12/611,019

(22) Filed: Nov. 2, 2009

(65) Prior Publication Data

US 2011/0072791 A1 Mar. 31, 2011

Related U.S. Application Data

(60) Provisional application No. 61/246,936, filed on Sep. 29, 2009.

(51) Int. Cl.
*F01N 3/029* (2006.01)

(52) U.S. Cl. ........... 60/295; 60/274; 60/289; 60/293; 60/297; 60/311; 180/65.1

(58) Field of Classification Search .......... 60/274, 60/289, 293, 295, 297, 311, 278; 180/65.1
See application file for complete search history.

(56) References Cited

U.S. PATENT DOCUMENTS

| | | | | |
|---|---|---|---|---|
| 5,974,792 | A * | 11/1999 | Isobe | 60/278 |
| 6,195,985 | B1 * | 3/2001 | del Re et al. | 60/274 |
| 7,299,626 | B2 | 11/2007 | Barasa et al. | |
| 2004/0226287 | A1 * | 11/2004 | Edgar et al. | 60/295 |
| 2008/0276602 | A1 * | 11/2008 | McCabe et al. | 60/295 |
| 2008/0282674 | A1 * | 11/2008 | Gonze et al. | 60/285 |
| 2009/0025371 | A1 * | 1/2009 | Hermansson et al. | 60/286 |
| 2009/0120071 | A1 | 5/2009 | Gandhi et al. | |
| 2010/0139630 | A1 | 6/2010 | Yang | |
| 2011/0066316 | A1 * | 3/2011 | Perrard | 701/29 |

OTHER PUBLICATIONS

Hepburn, Jeffrey S. et al., "System and Method for Regenerating a Particulate Filter Accompanied by a Catalyst," U.S. Appl. No. 12/638,511, filed Dec. 15, 2009, 53 pages.

Hepburn, Jeffrey S. et al., "System and Method for Regenerating a Particulate Filer," U.S. Appl. No. 12/638,533, filed Dec. 15, 2009, 55 pages.

Ruhland, Helmut H. et al., "Method for Controlling Spark for Particulate Filter Regenerating," U.S. Appl. No. 12/638,555, filed Dec. 15, 2009, 52 pages.

Hubbard, Carolyn P. et al., "Fuel Control for Spark Ignited Engine Having a Particulate Filter System," U.S. Appl. No. 12/638,595, filed Dec. 15, 2009, 52 pages.

Hubbard, Carolyn P. et al., "Method for Controlling Fuel of a Spark Ignited Engine While Regenerating a Particulate Filter," U.S. Appl. No. 12/638,633, filed Dec. 15, 2009, 53 pages.

(Continued)

*Primary Examiner* — Thomas Denion
*Assistant Examiner* — Jorge Leon, Jr.
(74) *Attorney, Agent, or Firm* — Julia Voutyras; Alleman Hall McCoy Russell & Tuttle LLP

(57) ABSTRACT

Systems and methods for controlling regeneration of a particulate filter downstream of an engine coupled to an energy conversion device are provided herein. One exemplary method includes, during first engine shutdown conditions, increasing excess oxygen to the particulate filter by spinning the engine with the energy conversion device, and regenerating the particulate filter. The method also includes, during second engine shutdown conditions, decreasing the excess oxygen to the particulate filter.

16 Claims, 13 Drawing Sheets

OTHER PUBLICATIONS

Ruona, William C. et al., "Gasoline Particulate Filter Regeneration and Diagnostics," U.S. Appl. No. 12/689,930, filed Jan. 19, 2010, 60 pages.

Bidner, David K. et al., "Particulate Filter Regeneration During Engine Shutdown," U.S. Appl. No. 12/629,743, filed Dec. 2, 2009, 41 pages.

Bidner, David K. et al., "Particulate Filter Regeneration During Engine Shutdown," U.S. Appl. No. 12/610,991, filed Nov. 2, 2009, 65 pages.

Bidner, David K. et al., "Particulate Filter Regeneration in an Engine," U.S. Appl. No. 12/611,002, filed Nov. 2, 2009, 64 pages.

Bidner, David K. et al., "Particulate Filter Regeneration in an Engine," U.S. Appl. No. 12/611,009, filed Nov. 2, 2009, 65 pages.

Bidner, David K. et al., "Particulate Filter Regeneration in an Engine," U.S. Appl. No. 12/611,027, filed Nov. 2, 2009, 52 pages.

Lupescu, Jason A. et al., "Exhaust Treatment System for Internal Combustion Engine," U.S. Appl. No. 12/579,618, filed Oct. 15, 2009, 57 pages.

Van Nieuwstadt, Michiel J., "Control of Exhaust Flow in an Engine Including a Particulate Filter," U.S. Appl. No. 12/648,833, filed Dec. 29, 2009, 38 pages.

Van Nieuwstadt, Michiel J., "Controlling Operation of Exhaust of an Engine Including a Particulate Filter," U.S. Appl. No. 12/648,839, filed Dec. 29, 2009, 38 pages.

Van Nieuwstadt, Michiel J. et al., "System and Method for Regenerating a Particulate Filter for a Direct Injection Engine," U.S. Appl. No. 12/620,354, filed Nov. 17, 2009, 47 pages.

Van Nieuwstadt, Michiel J. et al., "Method for Adjusting Boost Pressure While Regenerating a Particulate Filter for a Direct Injection Engine," U.S. Appl. No. 12/620,366, filed Nov. 17, 2009, 46 pages.

Van Nieuwstadt, Michiel J. et al., "System for Regenerating a Particulate Filter and Controlling EGR," U.S. Appl. No. 12/620,374, filed Nov. 17, 2009, 46 pages.

Kerns, James M. et al., "Method for Regenerating a Particulate Filter for a Boosted Direct Injection Engine," U.S. Appl. No. 12/620,386, filed Nov. 17, 2009, 46 pages.

Zawacki, Garry A. et al., "System for an Engine Having a Particulate Matter Sensor," U.S. Appl. No. 12/643,563, filed Dec. 21, 2009, 40 pages.

Zawacki, Garry A. et al., "Method for Evaluating Degradation of a Particulate Matter Sensor," U.S. Appl. No. 12/643,568, filed Dec. 21, 2009, 38 pages.

Zawacki, Garry A. et al., "Method For Evaluating Degradation of a Particulate Matter Sensor After an Engine Start," U.S. Appl. No. 12/643,575, filed Dec. 21, 2009, 38 pages.

* cited by examiner

PARTICULATE FILTER REGENERATION IN AN ENGINE COUPLED TO AN ENERGY CONVERSION DEVICE

CROSS-REFERENCE TO RELATED APPLICATIONS

This application claims priority from U.S. Provisional Patent Application No. 61/246,936, entitled "Systems and Methods for Controlling Regeneration of Particulate Filter in a Spark-Ignition Engine," filed Sep. 29, 2009, the disclosure of which is hereby incorporated by reference in its entirety and for all purposes.

TECHNICAL FIELD

The present application relates to regeneration control of a particulate filter downstream of an engine in a vehicle, where the engine is coupled to an energy conversion device.

BACKGROUND AND SUMMARY

During some conditions, turbocharged direct-injection engines may generate increased soot. For example, during some conditions, fuel may not sufficiently mix with air before combustion, for example due to reduced turbulence. Such phenomena may occur when the engine is operating at high speed and/or high loads.

The inventors herein have recognized that one approach to address such an issue may be to utilize a particulate filter in the exhaust. However, regeneration of the filter in the exhaust of a spark-ignited engine aimed at stoichoimetric emission control raises numerous issues. As just an example, sufficient excess oxygen for regeneration in the exhaust may result in increased NOx emissions.

The present description addresses various aspects of such regeneration and associated control, including adjusting operation during and/or after an engine shutdown to enable regeneration under such conditions. Specifically, in one example, methods and systems for controlling regeneration of a particulate filter downstream of an engine coupled to an energy conversion device are provided. An exemplary method includes, during first engine shutdown conditions, increasing excess oxygen to the particulate filter by spinning the engine with the energy conversion device, and regenerating the particulate filter. The method also includes, during second engine shutdown conditions, decreasing the excess oxygen to the particulate filter.

By spinning the engine via the energy conversion device during engine shutdown, excess oxygen can be directed to the particulate filter so that the particulate filter can be regenerated, while reducing disturbance to the conversion of combustion exhaust emissions. Further, vehicle motion can be maintained during particulate filter regeneration, in some examples. Further still, the particulate filter can be regenerated using techniques most appropriate for the current conditions, and thus, emissions can be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
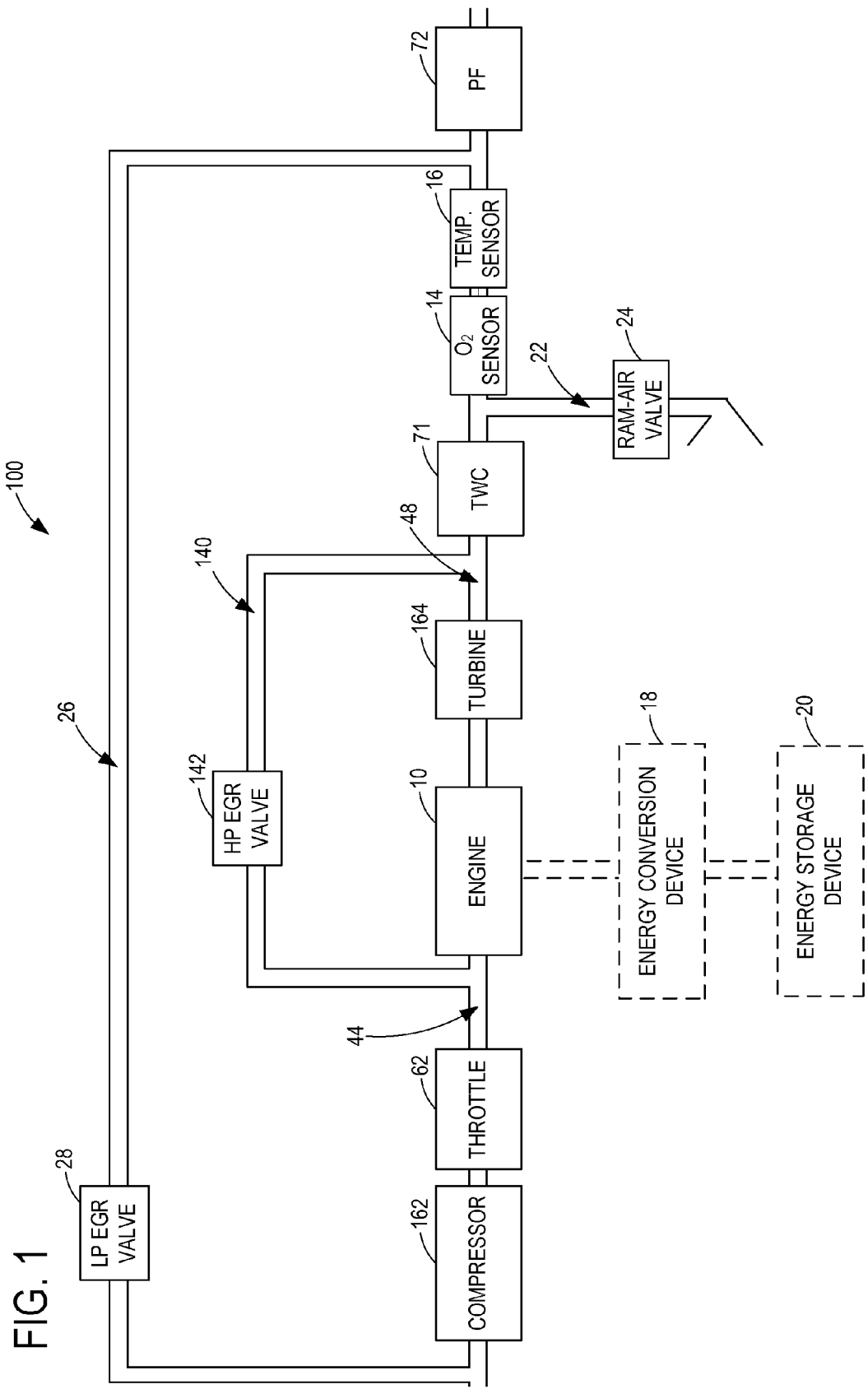
FIG. 1 is a block diagram of a system in a vehicle.
Figure 2:
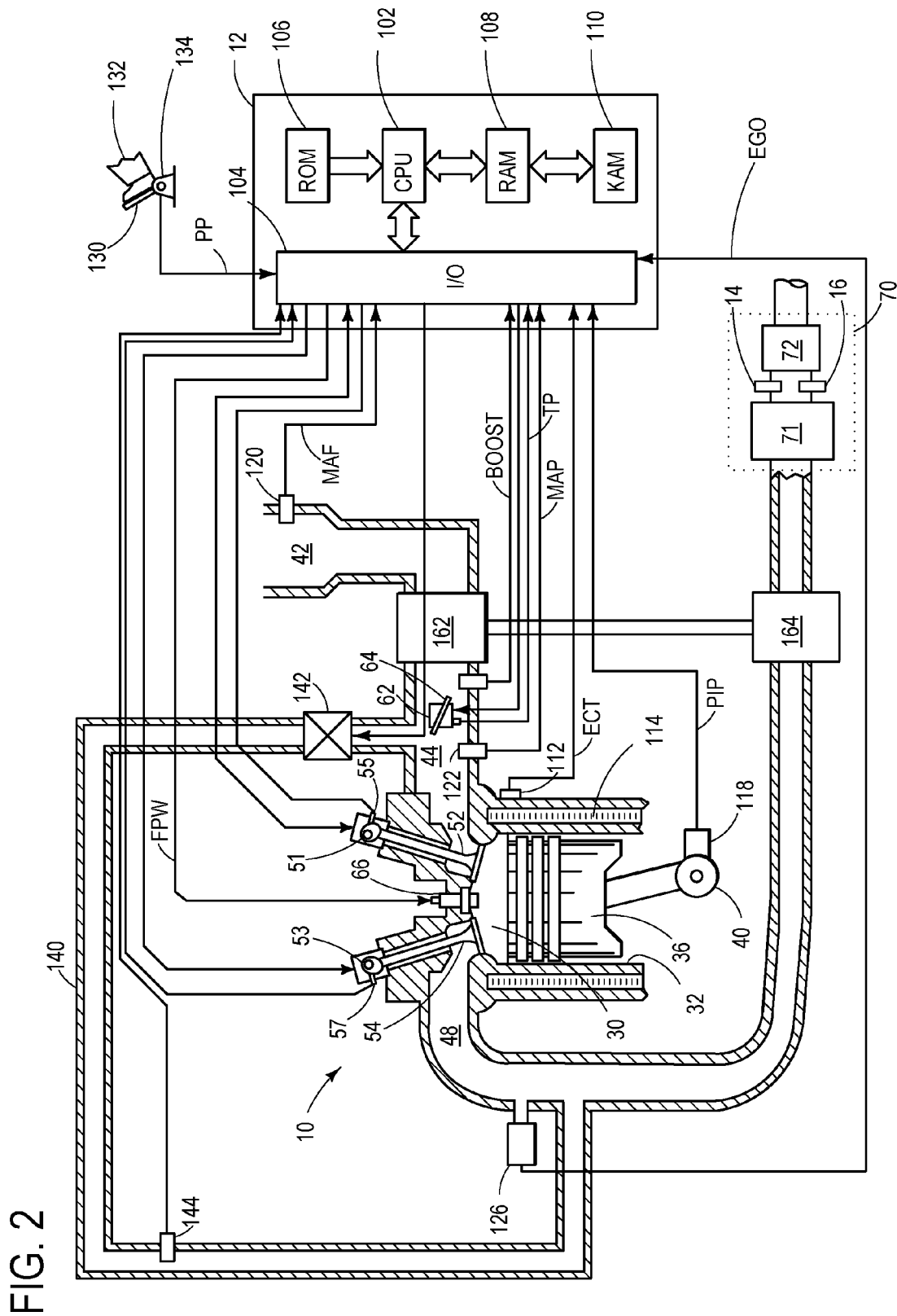
FIG. 2 is a schematic view of an engine of a vehicle.

Systems and methods for controlling regeneration of a particulate filter downstream of an engine are provided herein. Exemplary systems for controlling regeneration are schematically illustrated in FIG. 1 and FIG. 2, and the systems may each include a three-way catalyst and a particulate filter in an exhaust passage downstream of the engine.

In order to carry out a particulate filter regeneration, excess oxygen may be delivered to the particulate filter, where excess oxygen is an amount of oxygen that is greater than an amount of oxygen delivered during normal engine running when an air-fuel ratio is about stoichiometric. However, excess oxygen in an exhaust passage may saturate an oxygen storage capacity of a three-way catalyst, because three-way catalysts have a limited amount of oxygen storage. Thus, if the engine is running during a period in which the three-way catalyst is subject to excess oxygen (e.g., during particulate filter regeneration), NOx emissions may increase. Accordingly, in order to carry out particulate filter regeneration without degraded emission control operation of the three-way catalyst, particulate filter regeneration may be carried out during at least some engine shutdown and/or engine rest conditions, thereby reducing potential NOx emissions. Various example methods for such operation are provided herein.

Figure 3:
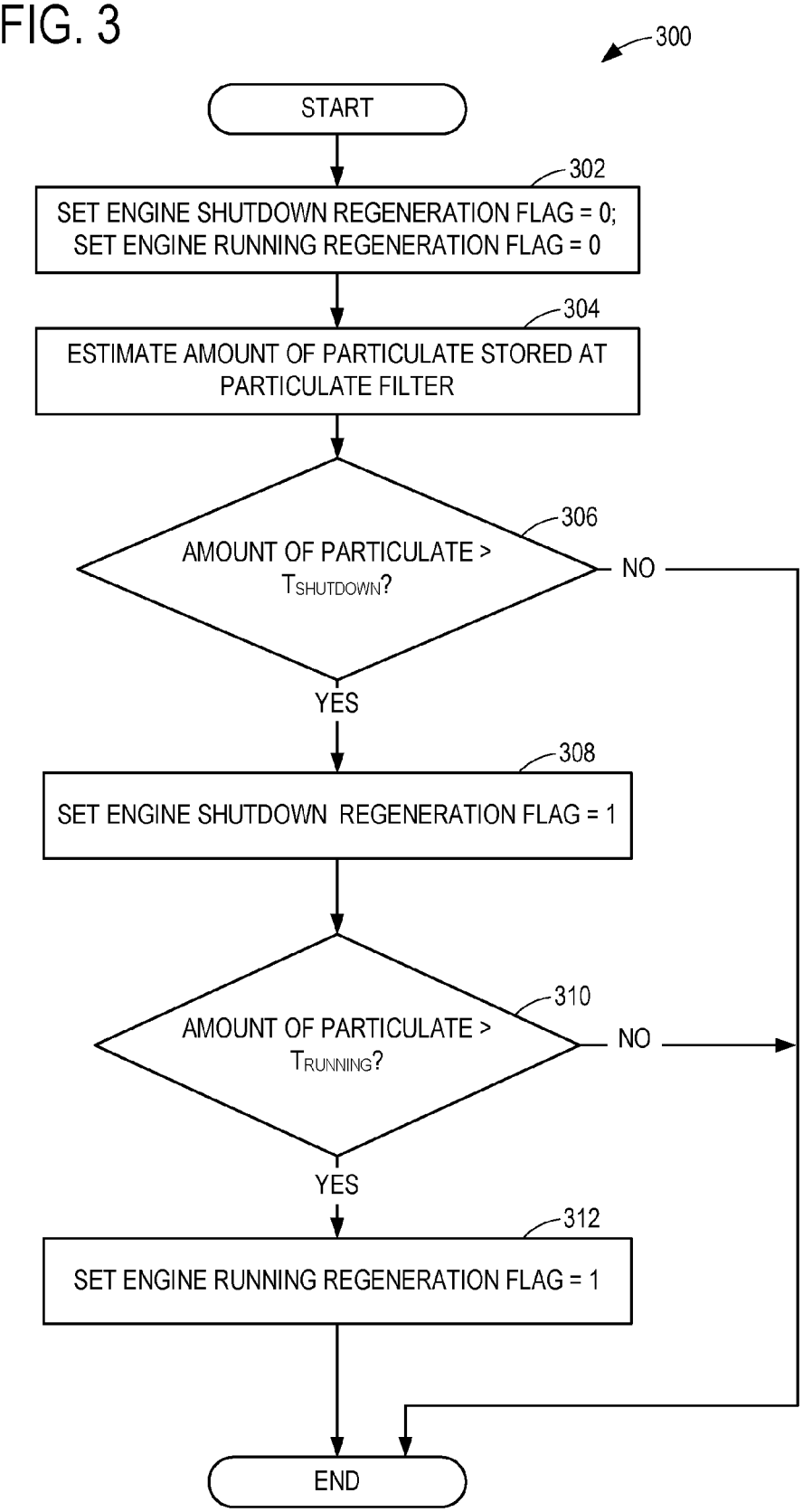
FIG. 3 is a flowchart illustrating a method for managing particulate filter regeneration.
Figure 5:
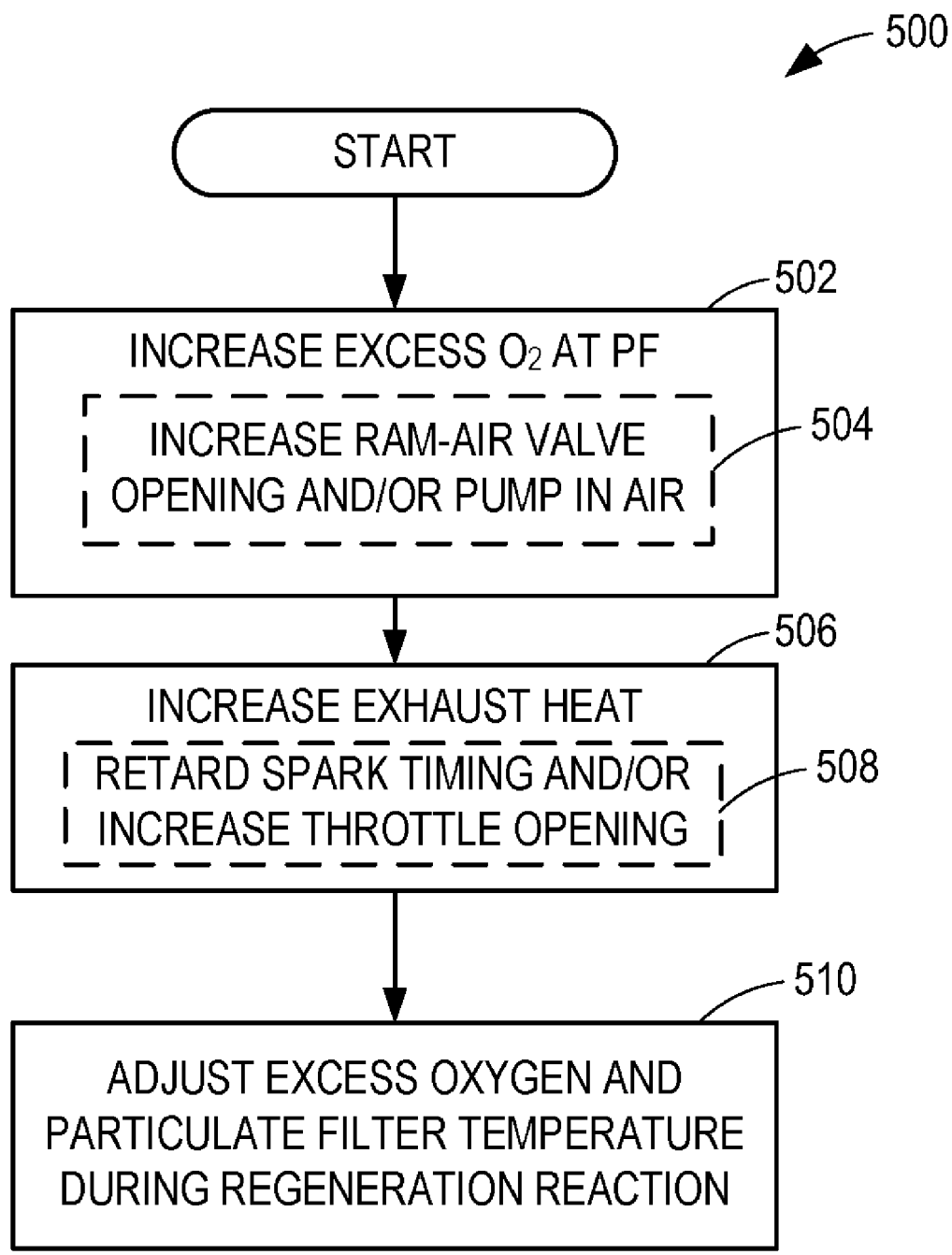
FIG. 5 is a flowchart illustrating a method for controlling a particulate filter regeneration that is carried out during engine running.
Figure 6:
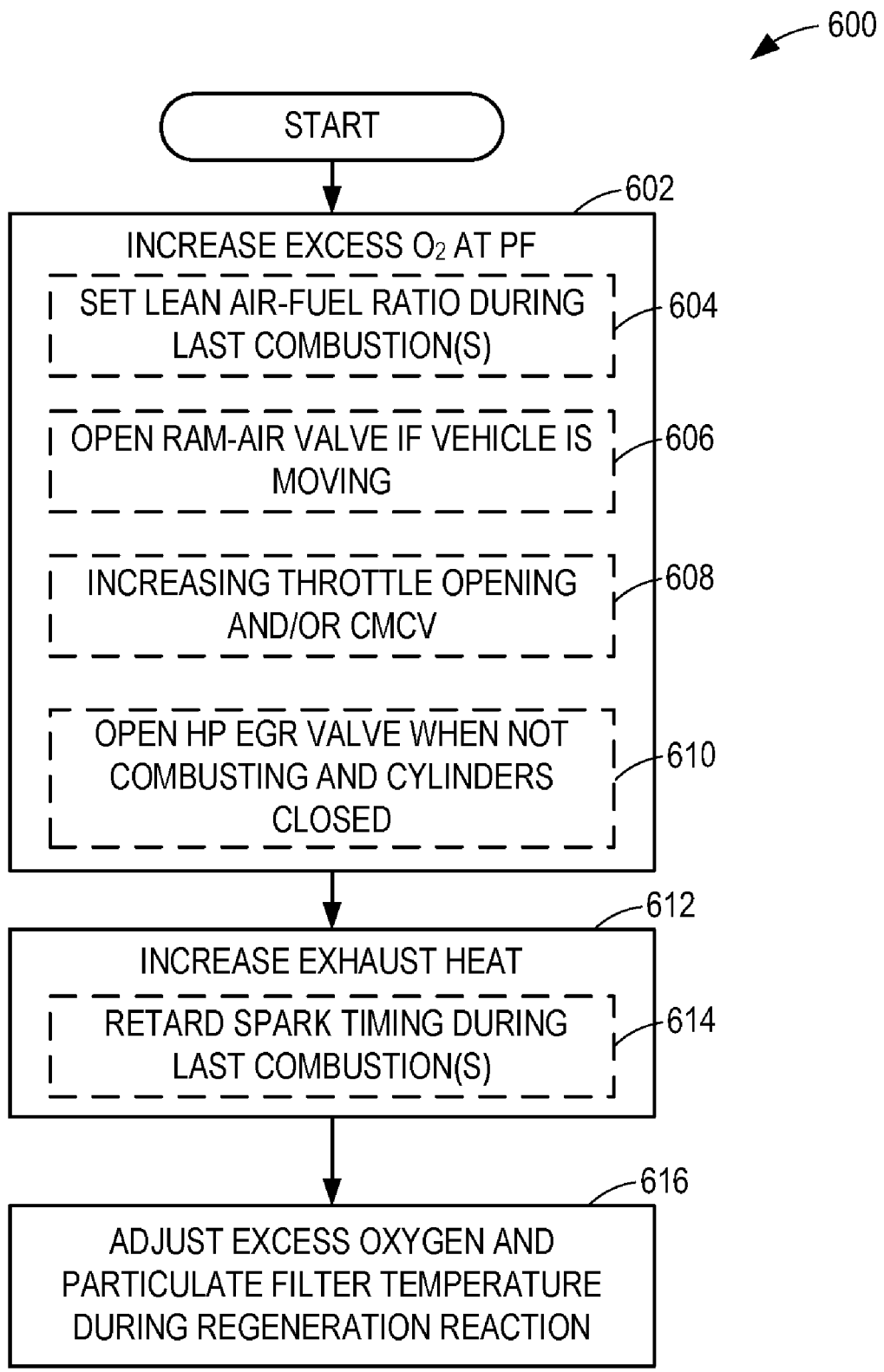
FIG. 6 is a flowchart illustrating a method for controlling particulate filter regeneration during an engine shutdown.

Specifically, FIG. 3 illustrates a method for requesting regeneration and, if so, determining under what conditions a regeneration should be carried out. For example, a regeneration may be carried out when an engine is running, during an engine shutdown, or some combination thereof. The routine of FIG. 4 includes carrying out the requested regeneration during the correspondingly selected conditions. The routine of FIG. 5 illustrates an example method for controlling regeneration during engine running, whereas FIG. 6 illustrates an example method for controlling regeneration during an engine shutdown and/or at engine rest. Thereafter, an example timeline of several operating parameters is presented by way of FIG. 7, which is an example of particulate filter regeneration that begins during engine running and continues through an engine shutdown. FIG. 8 is a second example timeline of several operating parameters during a particulate filter regeneration that is initiated at engine shutdown.

Figure 9:
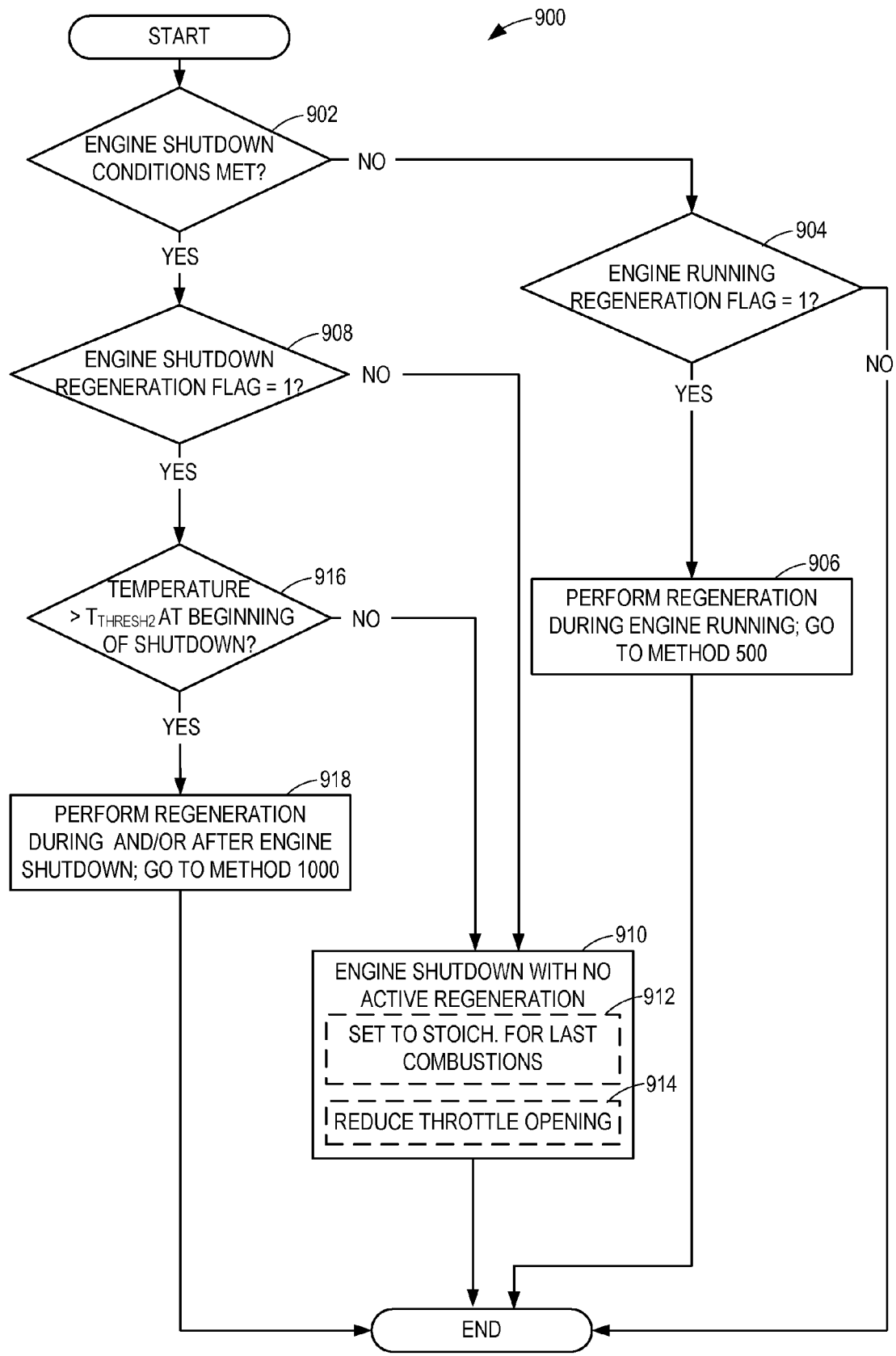
FIG. 9 is a flowchart illustrating a high-level method for controlling a particulate filter regeneration in a hybrid electric vehicle.
Figure 10:
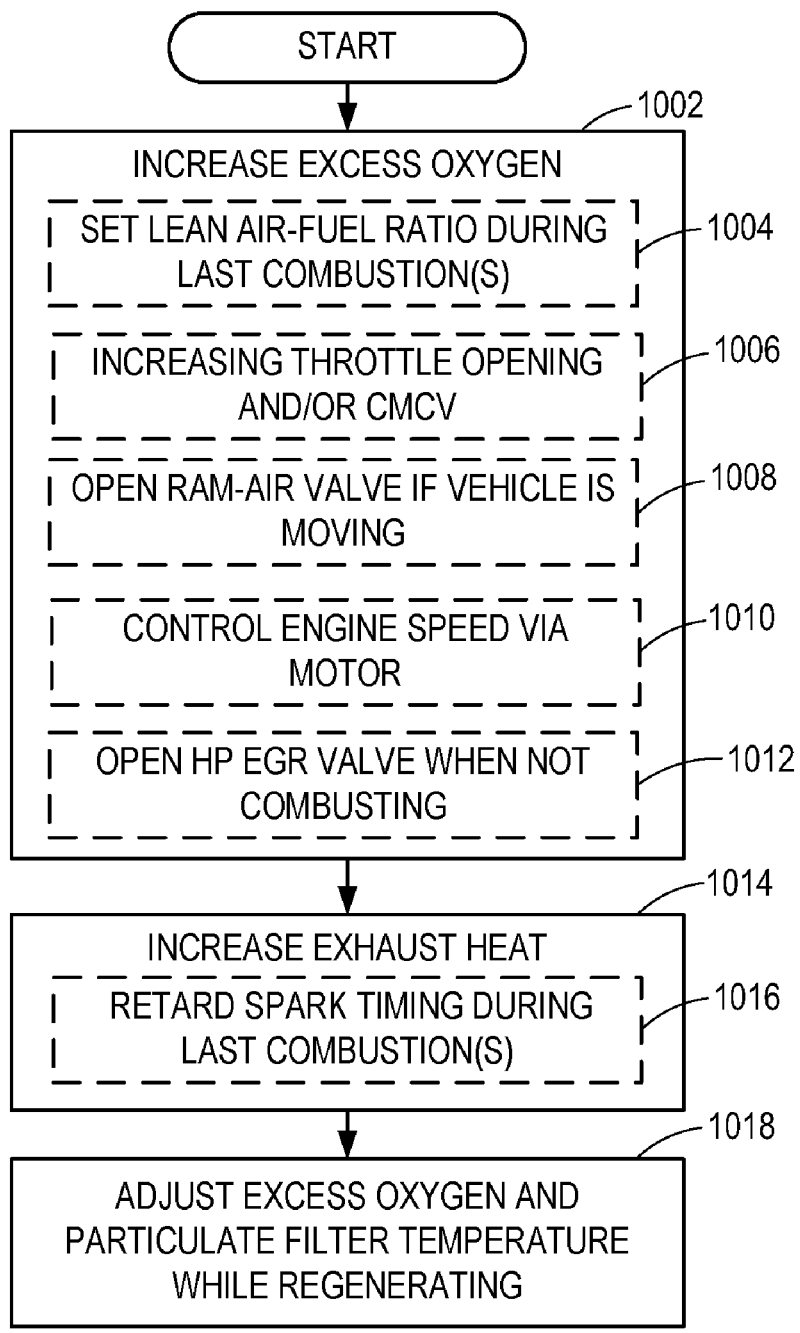
FIG. 10 is a flowchart illustrating a method for controlling particulate filter regeneration during an engine shutdown in a hybrid electric vehicle.
Figure 11:
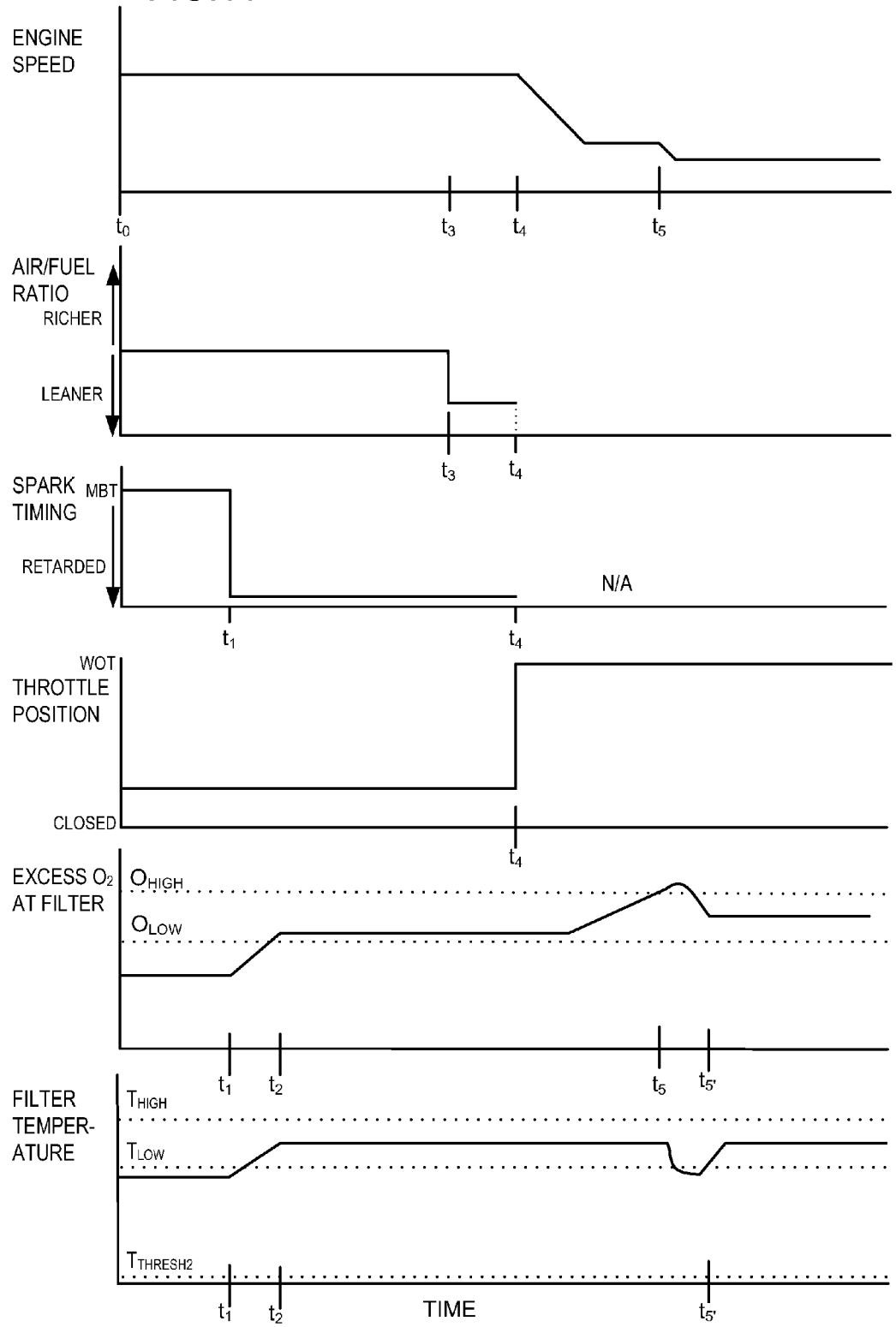
FIG. 11 is an exemplary timeline of several engine parameters during a particulate filter regeneration that begins during engine running and is continued during engine shutdown in a hybrid electric vehicle.
Figure 12:
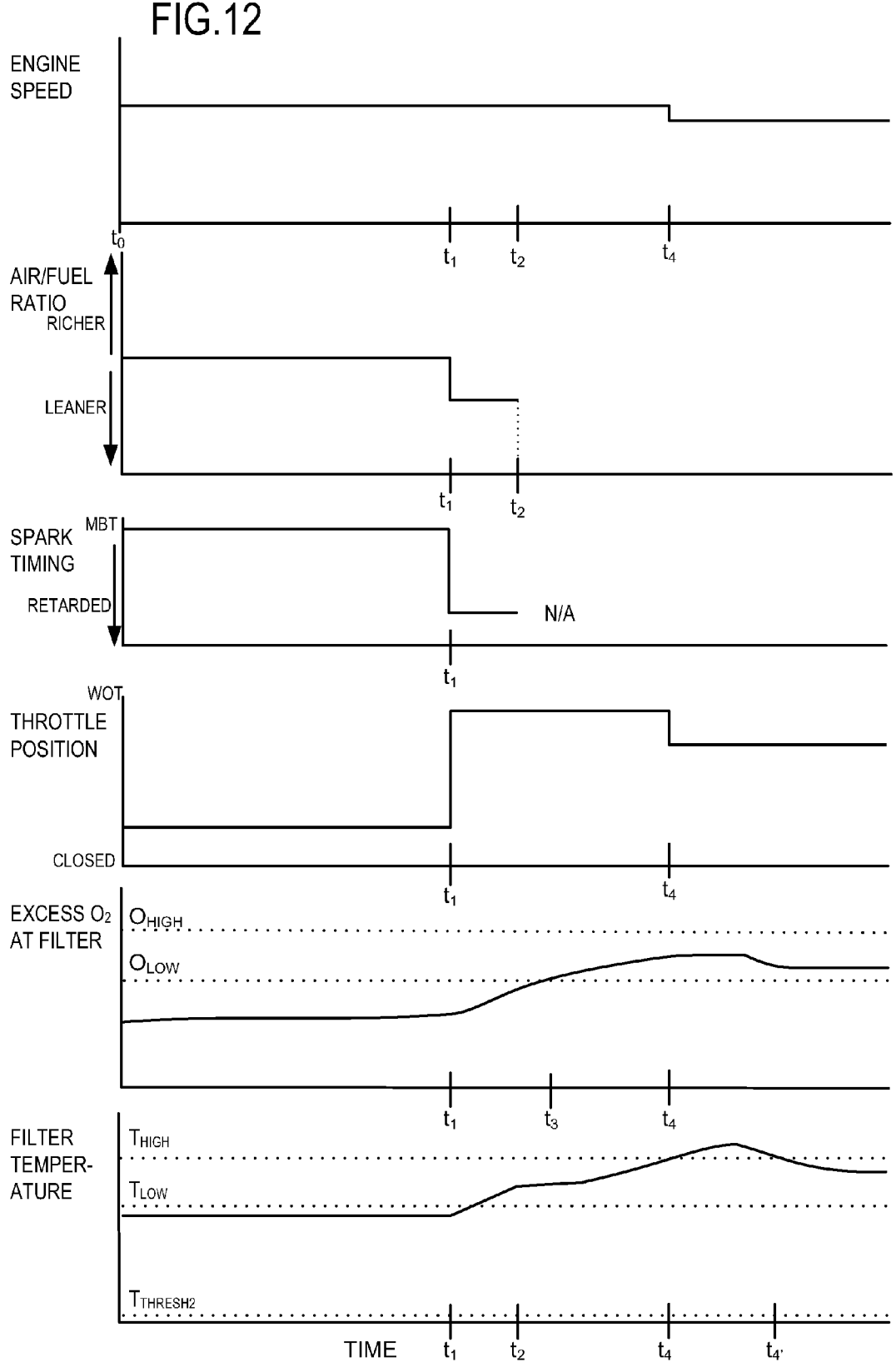
FIG. 12 is an exemplary timeline of several engine parameters during a particulate filter regeneration carried out during and after an engine shutdown in a hybrid electric vehicle.

FIG. 9 illustrates a high-level method for determining when to perform particulate filter regeneration in a hybrid electric vehicle (HEV). FIG. 10 specifically illustrates a method for controlling regeneration during an engine shutdown in an HEV. An example timeline of various operating parameters during a particulate filter regeneration that begins during engine running in an HEV is illustrated by FIG. 11, and a second example timeline of particulate filter regeneration that begins during engine shutdown (e.g., after a decision to stop engine combusting) is shown by FIG. 12.

Figure 13:
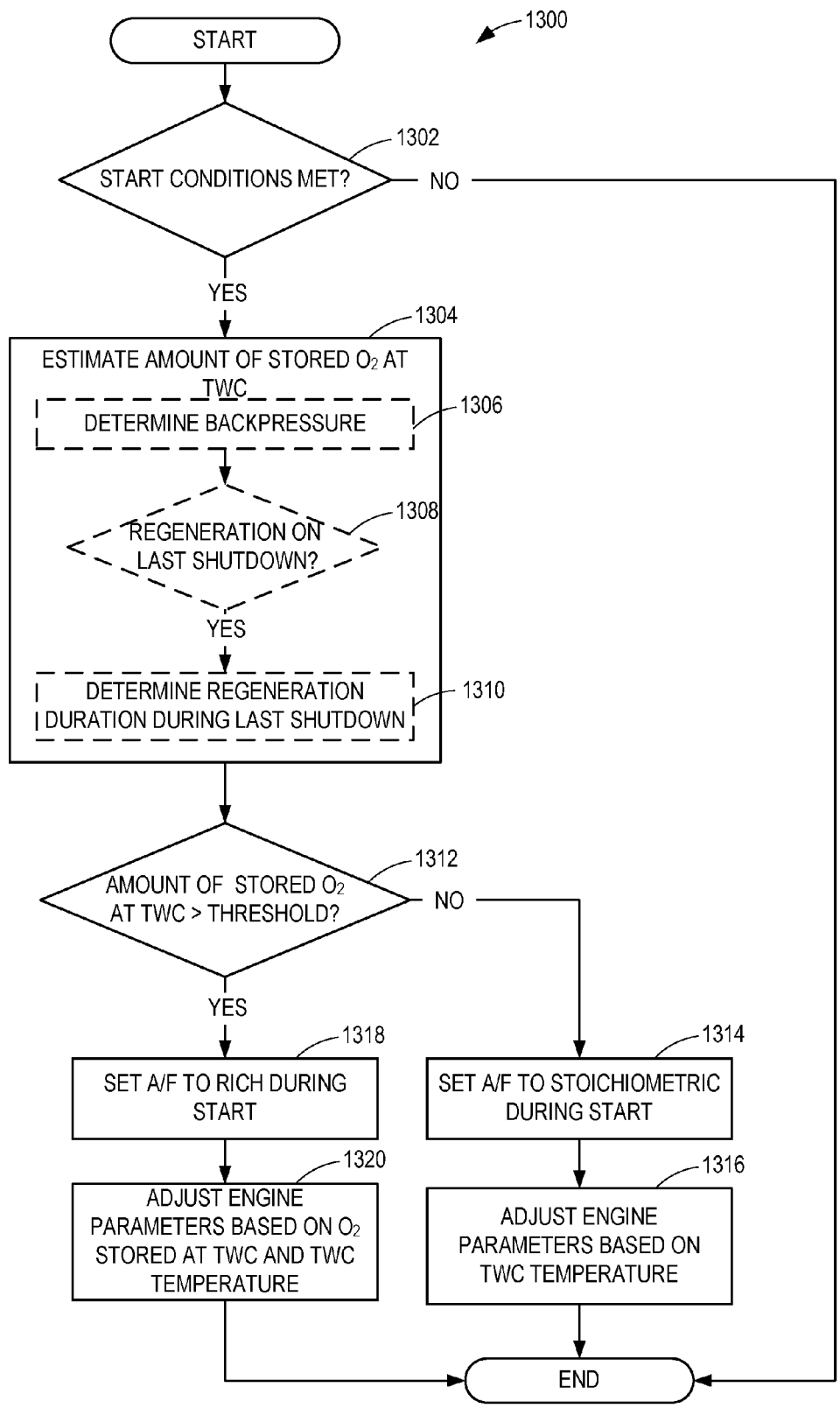
FIG. 13 is a flowchart illustrating a method for controlling an engine start after an engine shutdown.

Finally, FIG. 13 is a flowchart of a method for starting an engine, which may or may not be in an HEV, after an engine shutdown.

Referring now to FIG. 1, the figure schematically depicts a system 100 including an internal combustion engine 10, which is a direct-injection, spark-ignition engine in some examples. The engine 10 may have a plurality of cylinders, and engine output torque may be transmitted to a transmission (not shown), which may be, in turn, coupled to a drive wheel in contact with a road surface. The transmission may be a manual transmission, automatic transmission, or combinations thereof. Further, various additional components may be included, such as a torque converter, and/or other gears such as a final drive unit, etc.

The system 100 includes a turbocharger including a turbine 164 downstream of the engine 10 and a compressor 162 upstream of the engine 10. A throttle 62 for controlling air intake into the intake manifold 44 is shown positioned downstream of the compressor 162. In other examples, the throttle 62 may be positioned upstream of the compressor 162, and/or additional throttles may be provided.

The system 100 is also equipped with a high-pressure (HP) EGR passage 140 having a first opening downstream of the throttle 62 and upstream of cylinders of the engine 10, and a second opening downstream of the turbine 164 and upstream of a particulate filter (PF) 72, by which exhaust gas can be recirculated. A high-pressure (HP) EGR valve 142 is positioned between the first opening and second opening of the HP EGR passage 140, and can be positioned based on current engine operating conditions. For example, the HP EGR valve 142 may be open during engine running when engine boost from the turbocharger is not desired.

The system 100 may also include a low-pressure EGR conduit 26 having a low-pressure (LP) EGR valve 28. The low-pressure EGR conduit 26 may re-circulate gas from an opening downstream of a three-way catalyst (TWC) 71 to a position upstream of the compressor 162, for example, when engine boost is desired and/or being carried out by the turbocharger, and while the HP EGR valve 142 is closed.

The engine 10 may be configured to output exhaust, via exhaust passage 48, to the TWC 71 positioned downstream of the engine 10. One or more exhaust sensors may be positioned in exhaust passage 48. For example, an oxygen sensor 14 and a temperature sensor 16 are positioned downstream of the TWC 71 to measure excess oxygen and temperature, respectively. There may be additional oxygen and temperature sensors upstream of, downstream of, or coupled to each of the TWC 71 and the particulate filter 72. Excess oxygen may be expressed as a percentage of oxygen in an airflow in the exhaust passage 48. The TWC 71 may be positioned upstream of the particulate filter 72 in order to reduce emissions so that soot and other particulates received at the particulate filter 72 are largely inert.

The system 100 may further include a ram-air conduit 22 having an outlet upstream of the particulate filter 72, and configured to direct fresh ram-air into the exhaust passage 48 upstream of the PF 72 when the vehicle is moving. Specifically, an opening of a ram-air flow valve 24 may be selectively controlled to increase or decrease the flow of fresh ram-air into the exhaust passage 48, thereby affecting an amount of excess oxygen in the exhaust passage 48. With this configuration, fresh air can be drawn to the particulate filter 72 while bypassing the TWC 71.

In one example embodiment, an energy conversion device 18 is coupled to the engine 10. The energy conversion device 18 may include a motor, or a generator, among others and combinations thereof. The energy conversion device 18 is further shown coupled to an energy storage device 20, which may include a battery, a capacitor, a flywheel, a pressure vessel, etc. The energy conversion device 18 can be operated to absorb energy from vehicle motion and/or the engine and convert the absorbed energy to an energy form suitable for storage by the energy storage device 20 (e.g., provide a generator operation). The energy conversion device 18 can also be operated to supply an output (power, work, torque, speed, etc.) to the drive wheels and/or engine 10 (e.g., provide a motor operation to keep engine spinning while not combusting). It should be appreciated that the energy conversion device 18 may, in some embodiments, include only a motor, only a generator, or both a motor and generator, among various other components used for providing the appropriate conversion of energy between the energy storage device and the vehicle drive wheels and/or engine.

Connections between engine 10, energy conversion device 18, the transmission, and drive wheel transmit mechanical energy from one component to another, whereas connections between the energy conversion device 18 and the energy storage device 20 may transmit a variety of energy forms such as electrical, mechanical, etc. For example, torque may be transmitted from engine 10 to drive the vehicle drive wheels via the transmission and, as described above, energy conversion device 18 may be configured to operate in a generator mode and/or in a motor mode. In a generator mode, energy conversion device 18 absorbs some or all of the output from engine 10 and/or transmission, which reduces the amount of engine output delivered to the drive wheel, or the amount of braking torque to the drive wheel. Such operation may be employed, for example, to achieve efficiency gains through regenerative braking, improved engine efficiency, etc. Further, the output received by the energy conversion device 18 may be used to charge energy storage device 20. In motor mode, the energy conversion device 18 may supply mechanical output to engine 10 and/or transmission, for example by using electrical energy stored in an electric battery (e.g., energy storage device 20).

Hybrid-electric propulsion embodiments may include full hybrid systems, in which the vehicle can run on just the engine, just the energy conversion device (e.g., the motor), or a combination of both. Assist or mild hybrid configurations may also be employed, in which engine combustion is the primary torque source, with the hybrid propulsion system acting to selectively deliver added torque, for example during tip-in or other conditions. Further still, starter/generator and/or smart alternator systems may also be used.

From the above, it should be understood that the exemplary hybrid-electric propulsion system is capable of various modes of operation. In a full hybrid implementation, for example, the propulsion system may operate using energy conversion device 18 (e.g., an electric motor) as the only torque source spinning the engine and/or propelling the vehicle. This "electric only" mode of operation may be employed during braking, low speeds, while stopped at traffic lights, etc. In another mode, engine 10 is running (e.g., combusting), and acts as the only torque source powering drive wheel. In still another mode, which may be referred to as an "assist" mode, the energy conversion device 18 may supplement and act in cooperation with the torque provided by engine combustion. As indicated above, energy conversion device 18 may also operate in a generator mode, in which torque is absorbed from engine 10 and/or transmission.

One or more components discussed with respect to FIG. 1 (e.g., HP EGR valve, LP EGR valve, turbine wastegate valve, compressor valved bypass, throttle, tailpipe valve, etc.) can be manipulated by an electronic controller. In some examples, an objective of such manipulation may include controlling an amount or rate of excess oxygen flow directed to the particulate filter, and/or a temperature of exhaust gas. Such an electronic controller is discussed in detail with respect to FIG. 2.

Turning now to FIG. 2, a schematic diagram illustrates one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via a respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

An ignition system (not shown) can provide an ignition spark to combustion chamber 30 via a spark plug in response to a spark advance signal from controller 12, under select operating modes. Under some conditions or in some embodiments, compression ignition may be carried out without a spark ignition.

Intake passage 42 or intake manifold 44 may include a throttle 62 having a throttle plate 64. In this particular example, the position of throttle plate 64, or a throttle opening, may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass airflow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake manifold 44. In this example, an HP EGR passage 140 is illustrated. The amount of EGR provided to intake manifold 44 may be varied by controller 12 via HP EGR valve 142. Further, an EGR sensor 144 may be arranged within the HP EGR passage 140 and may provide an indication of one or more of pressure, temperature, and concentration of the exhaust gas. Alternatively, the EGR flow may be controlled through a calculated value based on signals from the MAF sensor (upstream), MAP (intake manifold), MAT (manifold gas temperature) and the crank speed sensor. Further, the EGR flow may be controlled based on an exhaust $O_2$ sensor and/or an intake oxygen sensor (intake manifold). Under some conditions, the EGR system may be used to regulate the temperature of the air and fuel mixture within the combustion chamber and/or the temperature at a particulate filter, as will be discussed. While FIG. 2 shows a high pressure EGR system, a low pressure EGR system may additionally, or alternatively, be used. In a low pressure EGR system, EGR may be routed from downstream of a turbine of a turbocharger to upstream of a compressor of the turbocharger, as shown in FIG. 1.

As such, engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine 10 and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control system 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Although oxygen sensor 14 and temperature sensor 16 are shown in addition to exhaust gas sensor 126 in FIG. 2, one or more of these sensors may be omitted and/or moved.

The emission control system 70 is shown arranged along exhaust passage 48 downstream of exhaust gas sensor 126. In this example, emission control system 70 includes the three-way catalyst 71 and the particulate filter (PF) 72. In some embodiments, PF 72 may be located downstream of the three-way catalyst 71 (as shown in FIG. 2), while in other embodiments, PF 72 may be positioned upstream of the catalyst (not shown in FIG. 2). Further, PF 72 may be arranged between two or more three-way catalysts, or other emission control devices (e.g., selective catalytic reduction system, NOx trap) or combinations thereof. During operation of engine 10, components of the emission control system 70 may be periodically reset by operating at least one cylinder of the engine within a particular air/fuel ratio.

Controller 12 is shown in FIG. 2 as a microcomputer, including microprocessor 102, input/output ports 104, an electronic storage medium for executable programs and calibration values shown as read-only memory 106 in this particular example, random access memory 108, keep alive memory 110, and a data bus. Controller 12 may receive various signals from sensors coupled to engine 10, in addition to those signals previously discussed, including measurement of inducted mass airflow (MAF) from mass airflow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP), or throttle opening, from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by microprocessor 102 for performing the methods described herein, as well as other variants that are anticipated but not specifically listed.

As described above, FIG. 2 shows only one cylinder of a multi-cylinder engine, and each cylinder may similarly include its own set of intake/exhaust valves, fuel injector, spark plug, etc.

Now, particulate filter regeneration control will be described in detail. Turning to FIG. 3, the flowchart illustrates an exemplary method 300 for managing particulate filter regeneration. At 302, an engine shutdown regeneration flag and an engine running regeneration flag are initially set to zero. At 304, an amount of particulate, or soot, stored at a particulate filter is estimated by an electronic controller, for example. This may be achieved by measuring a backpressure value, such as a change in backpressure in the exhaust, and matching the backpressure value to an amount of particulate using a table or calculation stored at an electronic controller. At 306, it is determined if the estimated amount of particulate is greater than a first threshold amount, $T_{SHUTDOWN}$. If the answer is no at 306, and the amount of particulate is below the first threshold amount $T_{SHUTDOWN}$, the method 300 is terminated. If the answer is yes at 306, the engine shutdown regeneration flag is set equal to one at 308, indicating that a regeneration during engine shutdown is desirable when conditions are appropriate for doing so.

At 310, it is determined if an amount of particulate, or soot, at the particulate filter is greater than a second threshold amount, $T_{RUNNING}$. If the answer is no at 310, and the amount of particulate is greater than $T_{SHUTDOWN}$ and less than $T_{RUNNING}$, the method 300 may be terminated, and the engine shutdown regeneration flag may be equal to one until an engine shutdown regeneration is at least partially completed, or until the amount of particulate is less than $T_{SHUTDOWN}$, in some examples.

If the answer is yes at 310, and the amount of particulate, or soot, is greater than $T_{RUNNING}$, the engine running regeneration flag may be set equal to one at 312, indicating that an engine running regeneration is desirable when conditions are next appropriate for doing so. As such, the engine running regeneration flag may be equal to one until an engine running regeneration (e.g., regeneration during at least partial engine combusting conditions) is carried out, or until the amount of particulate is less than $T_{RUNNING}$.

An engine shutdown regeneration of the particulate filter may be a partial regeneration because it may not fully rid the particulate filter of particulate, or soot. As such, the first threshold amount $T_{SHUTDOWN}$ may be less than the second threshold amount $T_{RUNNING}$ in some examples. However, there may also be conditions where it is desirable to carry out an engine running regeneration when the first threshold amount $T_{SHUTDOWN}$ is met and the second threshold amount $T_{RUNNING}$ is not met, such as when conditions are appropriate for performing an engine running particulate filter regeneration and there are substantially inconsequential effects of doing so. Further, there may be conditions where an engine shutdown regeneration is capable of fully regenerating the particulate filter, such that when both of the thresholds $T_{SHUTDOWN}$ and $T_{RUNNING}$ are met, an engine shutdown regeneration is carried out.

It is notable that a method for determining whether or not to carry out a particulate regeneration, or when to carry out a particulate filter regeneration, may take various forms, and that method 300 of FIG. 3 is merely exemplary.

In general, spark-ignition engines accumulate soot in the exhaust, especially under high load, boosted conditions. However, it is desirable to combust spark-ignition engines with about-stoichiometric air-fuel ratios (e.g., air-fuel ratios which oscillate about stoichiometric) in order to prevent high NOx emissions from a three-way catalyst downstream of the engine. In contrast to a lean-burn diesel engine, a spark-ignition engine may not be configured to regularly provide excess oxygen (e.g., a percentage of oxygen above that provided when operating about stoichiometry) in the exhaust during engine combusting conditions. As a result, some methods for controlling regeneration of a diesel particulate filter during engine running may not be applicable for regeneration control of a particulate filter in a spark-ignition engine. Further still, it can be challenging to achieve a high temperature at which a regeneration reaction can be carried out at a particulate filter while still maintaining control of the regeneration reaction in a spark-ignition engine.

Figure 4:
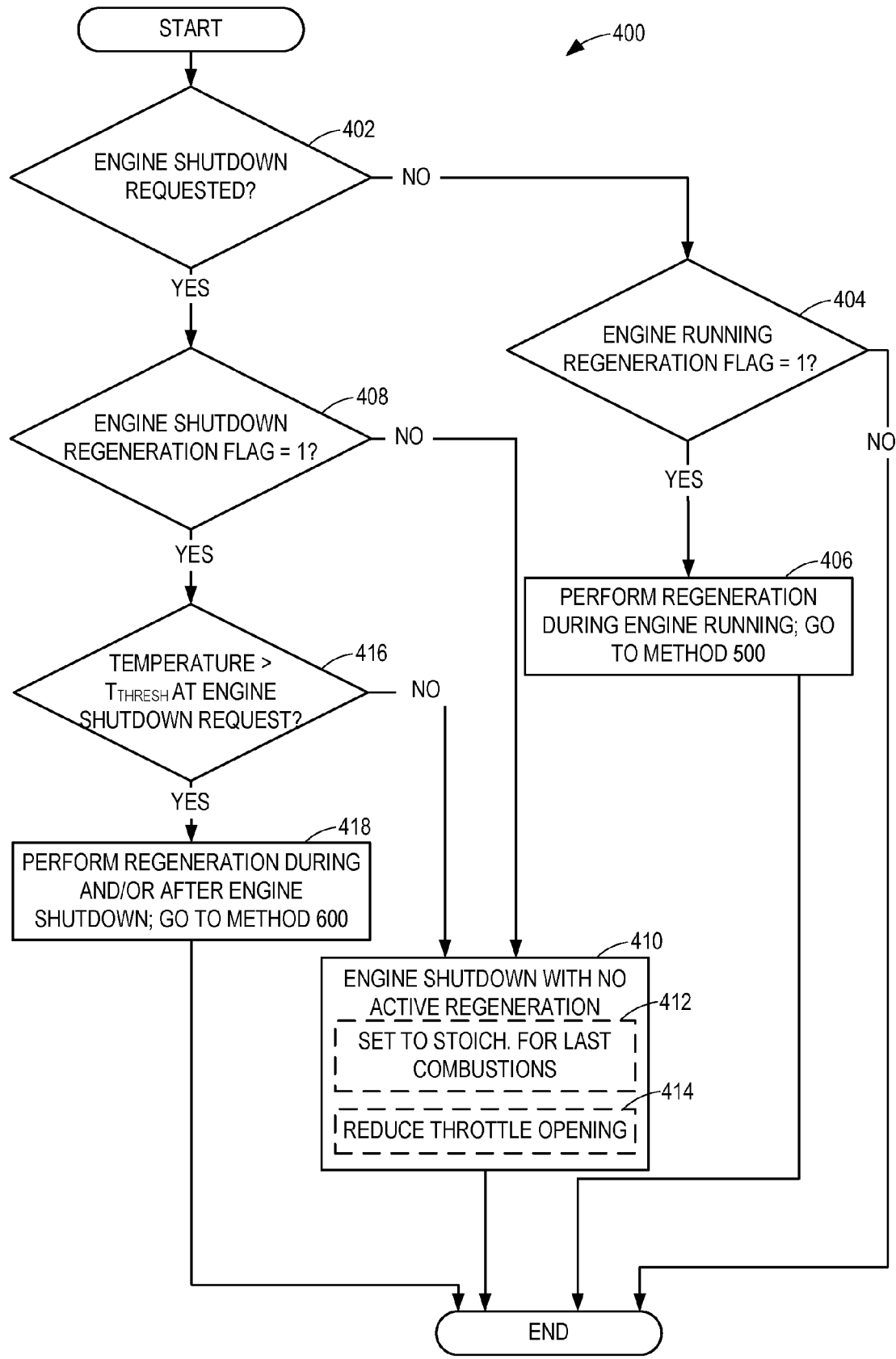
FIG. 4 is a flowchart illustrating a high-level method for controlling particulate filter regeneration.

To address some of these challenges, a high-level method 400 for controlling particulate filter regeneration during engine running and during engine shutdown in a spark-ignition engine is illustrated in FIG. 4. The method 400 is described generally and may thus apply to non-hybrid electric vehicles as well as hybrid electric vehicles.

At 402, it is determined if an engine shutdown has been requested. An engine shutdown request may be indicated, for example, when an engine is combusting and an operator turns off an ignition switch. As another example, an engine shutdown may be requested during conditions for a deceleration fuel shut-off operation. If the answer is no at 402, it is determined at 404 if the engine running regeneration flag is equal to one. If the answer is yes, and an engine running regeneration is desirable, the method 400 includes regenerating the particulate filter during engine running at 406, which is described in detail with respect to method 500 of FIG. 5.

However, if the answer is no at 404, such that an engine running regeneration flag is equal to zero, or engine running regeneration is not desirable, the method 400 may be terminated.

If the answer is yes at 402, such that an engine shutdown is requested, the method 400 proceeds to 408, where it is determined if the engine shutdown regeneration flag is equal to one. If the answer is no at 408, the method may proceed to 410, where an engine shutdown is performed without actively performing a particulate filter regeneration. That is, at 410, actions may not be taken to initiate, facilitate, or prolong particulate filter regeneration. It may be desirable to carry out an engine shutdown without active particulate filter regeneration under conditions where particulate filter regeneration may be unsuccessful, and/or when particulate filter regeneration can be delayed without compromising the integrity of the particulate filter.

Accordingly, at 410, the engine shutdown may include setting the air-fuel ratio to about stoichiometry for one or more last combustions at 412 to reduce excess oxygen to the particulate filter. The one or more last combustions may refer to combustions in a transition period between the engine shutdown request and the stopping of combustion (e.g., beginning of engine spin-down). This transition period (e.g., one or more last combustions) may include any number of combustions, for example in the range of 1-20. In some cases, there may not be a transition period between engine shutdown request and the beginning of engine spin-down, and there may be no last combustions.

Excess oxygen to the particulate filter may be reduced during an engine shutdown without an active regeneration by reducing the opening of the throttle, such as at 414. By reducing the opening of the throttle at engine shutdown without regeneration, the exhaust heat may dissipate at a predetermined rate (e.g., faster than during an engine shutdown lacking this step), thereby facilitating cooling of emission control components (e.g., three-way catalyst, particulate filter). Furthermore, the reduction of excess oxygen at 414 reduces a likelihood of particulate filter regeneration. In some examples, reducing the opening of the throttle at 414 may occur during one or more last combustions and/or during engine spin-down after the engine has stopped combusting. Although actions are taken to reduce excess oxygen directed to the particulate filter at 410, some particulate filter regeneration may spontaneously occur.

If the answer is yes at 408, the method 400 proceeds to 416 where it is determined if the temperature at the particulate filter is at least greater than a baseline temperature threshold $T_{THRESH}$ at the time of the engine shutdown request. If the answer is no at 416, regeneration may be delayed and the engine shutdown regeneration flag remains equal to one while the method 400 proceeds to 410 for an engine shutdown without an active regeneration. This may occur, for example, if an engine shutdown is performed in the midst of an engine cold start, and the temperature of the particulate filter is so low that a temperature required for a regeneration reaction may not be met even by manipulation of operating parameters during the engine shutdown. That is, the baseline temperature threshold $T_{THRESH}$ may be a temperature from which a temperature required for the regeneration reaction can be met via manipulation of operation parameters, and/or within a predetermined amount of time after engine shutdown request. In this way, failed attempts to regenerate the particulate filter during an engine shutdown can be prevented and/or reduced. Other parameters indicative of particulate filter readiness for regeneration may be checked at 416.

If the answer is yes at 416, and the particulate filter temperature is greater than $T_{THRESH}$, the method 400 includes actively regenerating the particulate filter during engine shutdown at 418, which is described in detail with respect to method 600 of FIG. 6. Notably in contrast to the engine shutdown of 410, the engine shutdown of 418 may include increasing excess oxygen to the particulate filter by setting the engine to combust with a lean air-fuel ratio and/or by increasing a throttle opening, as just some examples. The particulate filter regeneration of 418 may be carried out for at least a portion of engine shutdown.

In general, a regeneration reaction at a particulate filter may occur when the particulate filter is subject to particular levels of excess oxygen and particular temperature conditions. The excess oxygen and temperature at a particulate filter affect one another, and thus, both are actively controlled in order to carry out a regeneration reaction. As one example, some particulate filters will begin the regeneration reaction at a substantial rate when the temperature is at least 600 degrees F. and there is sufficient excess oxygen. The particulate filter regeneration reaction is exothermic, so once the reaction begins, the temperature may rapidly increase unless the excess oxygen is carefully controlled. For example, if the temperature exceeds a high temperature threshold, the reaction may become uncontrollable and can actually stop altogether as a level of excess oxygen needed for a high temperature regeneration cannot be supplied. Furthermore, if an amount of excess oxygen is too low at the particulate filter, the regeneration reaction may be unable to sustain itself. Further still, if excess oxygen levels are too high, the particulate filter may be cooled, and the regeneration reaction may slow down.

It may be appreciated that when a decision to perform engine shutdown regeneration occurs, such as at 418 of method 400, a regeneration reaction may already be being carried out at the particulate filter (e.g., during engine combustion, or engine running). Thus, the regeneration may be continued through the transition period to engine shutdown. An example of continuing regeneration from engine combustion conditions to engine shutdown conditions is described later, with respect to FIG. 7. If a regeneration reaction is already being carried out at the particulate filter at 416 of method 400, it is likely that the temperature of the particulate filter is greater than $T_{THRESH}$ and step 416 may be skipped. In another example, However, even if the answer is no at 408, but a regeneration reaction is already being carried out, the method 400 may proceed to 418 to finish, or continue the regeneration of the particulate filter.

Turning now to FIG. 5, a flowchart illustrates a method 500 for controlling a particulate filter regeneration during engine running. An engine running regeneration may include a regeneration that begins while at least one cylinder of the engine is combusting, and where a decision to shut down the engine has not been made.

At 502, the method 500 includes increasing excess oxygen at the particulate filter. While an engine is combusting, exhaust may be directed from the engine to a three-way catalyst, and then to a particulate filter downstream of the three-way catalyst. Thus, because a three-way catalyst may be subject to exhaust output from the engine, it is advantageous to maintain the air-fuel ratio of the combusting engine about stoichiometry to reduce emissions during engine running (e.g. at 502).

As such, the increasing of excess oxygen to the particulate filter at 502 may include, at 504, increasing an opening of a ram-air flow valve, such as ram-air flow valve 24 presented in FIG. 1. In this way, an amount of ram-air introduced into the exhaust passage upstream of a particulate filter can be increased as long as the vehicle is moving, and excess oxygen at the particulate filter can be increased to a level needed for regeneration, without increasing emissions at the three-way catalyst. It is notable that, during combusting engine conditions while the vehicle is in motion, ram-air may be introduced to the exhaust based on the pressure of the exhaust passage being below a predetermined pressure value. When the pressure differential between ram-air and an exhaust passage is sufficiently high, the ram-air can be pushed into or drawn into the exhaust by that pressure differential. Accordingly, it may be prudent to close a ram-air flow valve based on a pressure of an exhaust passage exceeding a predetermined pressure value, during some combusting engine conditions while the vehicle is in motion.

At 504 of method 500, fresh air may alternatively or additionally be pumped into the exhaust passage via a mechanical or electrical pump, or a vacuum may be created in the exhaust passage, and fresh air can be sucked into the exhaust passage thereafter.

Excess oxygen to the particulate filter can also be increased at 502 by manipulating the air-fuel ratio oscillations in the cylinders in such a manner that emissions from the three-way catalyst are maintained at a low level. For example, a lean duration can be increased, a rich duration can be reduced, or oscillation amplitude can be increased in order to increase excess oxygen in the exhaust. Furthermore, if ram-air is being introduced into the exhaust passage by vehicle motion, air-fuel ratio parameters may be adjusted based on a vehicle speed. For example, as a vehicle speed decreases, lean duration may be increased and/or rich duration may be decreased, to compensate for a potential decrease in ram-air flow. Similarly, as a vehicle speed increases, a rich duration may be increased, lean duration may be decreased, and/or oscillation amplitude may be decreased, to compensate for an expected increase in ram-air flow. In this way, the air-fuel ratio oscillations can compensate for increases and decreases in fresh air at the particulate filter that are due to changes in vehicle speed. However, it may be appreciated that an adjustment of an air-fuel ratio for the purpose of increasing excess oxygen to the particulate filter may be further based on potential or actual emissions from a three-way catalyst positioned upstream of the particulate filter.

The method 500 may also include increasing exhaust heat to the particulate filter at 506 so that the particulate filter can be heated to a temperature at which the regeneration reaction can take place at a desired rate. Increasing exhaust heat may include retarding spark timing and/or increasing a throttle opening at 508, which will, in turn, increase an air charge volume and exhaust heat. Exhaust heat can also, or alternatively, be increased by increasing engine speed or load.

At 510, the method 500 may include adjusting excess oxygen levels at the particulate filter, and/or adjusting particulate filter temperature during the regeneration reaction, to sustain the regeneration reaction. In some examples, the excess oxygen levels are adjusted based on feedback from an oxygen sensor upstream of the particulate filter.

Specifically, excess oxygen levels can be controlled during engine running regeneration by adjusting various operating parameters. These operating parameters may include a throttle opening, an air-fuel ratio, variable cam timing, and/or a ram-air flow valve opening, as just some examples. For example, in order to reduce excess oxygen at the particulate filter, a throttle opening may be reduced, an air-fuel ratio of one or more cylinders may be made richer (or a rich duration of an oscillation can be made longer), and/or an amount of fresh air supplied to the exhaust may be reduced.

Furthermore, ram-air may be independently controlled based on vehicle speed, so that as the vehicle speed increases, an opening of the ram-air flow valve decreases and as the vehicle speed decreases, the opening of the ram-air flow valve increases, in order to maintain a steady stream of ram-air in the exhaust passage. In order to increase excess oxygen at the particulate filter, a throttle opening may be increased, air-fuel ratio may be made leaner, and/or an amount of ram-air supplied to the exhaust may be increased based on vehicle speed. For example, if excess oxygen levels start to decline at the particulate filter, the ram-air flow valve opening can be increased to rapidly result in increased excess oxygen, if the vehicle is moving.

To decrease excess oxygen levels, a ram-air flow valve opening may be reduced, a throttle opening may be reduced and/or engine speed may be reduced, as some examples. By reducing excess oxygen levels, the exothermic regeneration reaction rate may slow down and the particulate filter may resultantly cool down.

Temperature can be adjusted at 510 based on feedback from a temperature sensor positioned at the particulate filter, or elsewhere in the exhaust passage. The particulate filter temperature can be adjusted during engine running regeneration by adjusting various operating parameters, such as spark timing, engine speed, and/or excess oxygen levels (e.g., by controlling throttle opening, air-fuel ratio, ram-air flow valve opening). For example, if the particulate filter temperature begins to decrease below a low temperature threshold at which the regeneration reaction will not be sustained at a desired rate, spark timing can be nominally retarded, throttle opening can be increased and/or engine speed can be increased (or decreased, based on the nominal exhaust temperature and engine speed) to increase exhaust heat. Also, in order to increase exhaust heat during engine running, excess oxygen may be increased or decreased, based on the nominal exhaust temperature. On the other hand, if the particulate filter temperature begins to increase above a high temperature threshold, such that sufficient excess oxygen levels may not be supplied for the regeneration reaction at that temperature, the particulate filter temperature may be reduced by decreasing the excess oxygen levels and/or by advancing spark timing. Additionally, engine speed can be decreased (or increased) in order to reduce particulate filter temperature.

Turning now to FIG. 6, a flowchart illustrates method 600 for controlling particulate filter regeneration during an engine shutdown. At 602, the method 600 may include increasing excess oxygen at the particulate filter. Increasing excess oxygen at the particulate filter during an engine shutdown may include setting an air-fuel ratio to be lean in at least one cylinder at 604 for one or more last combustions before engine combustion stops. Thus, the regeneration during engine shutdown may include the one or more last combustions immediately before the engine stops combusting. At 606, the method 600 may alternately or additionally include increasing an opening of a ram-air flow valve, if the vehicle is moving. A pressure of ram-air may fluctuate with variations in vehicle speed. Thus, the ram-air flow valve may be adjusted based on a vehicle speed, to compensate for potential changes in excess oxygen flowing to the particulate filter as a result of changes in ram-air pressure. Specifically, this may include adjusting the ram-air flow valve by increasing an opening of the ram-air flow valve as vehicle speed decreases, and increasing the opening as vehicle speed increases.

At 608, the method 600 may include increasing the throttle opening and or an opening of one or more charge motion control valves, during any portion of the engine shutdown, in order to increase (or maintain) excess oxygen flowing to the particulate filter.

At 610, increasing excess oxygen to the particulate filter may include stopping the engine at a position where the cylinders are closed, or closing the intake and exhaust valves of the cylinders using EVA for example, and increasing an opening of a HP EGR valve. This may also include opening the throttle, and closing an EGR wastegate. In this way, fresh air can be drawn in through the intake manifold, bypass the engine via the HP EGR passage, and be delivered immediately upstream of the three-way catalyst (as shown in FIG. 1) or immediately upstream of the particulate filter (in other examples). By having airflow bypass the engine, airflow resistance is reduced and an inertial airflow in the intake manifold can be taken advantage of, after engine combusting is stopped. This technique takes advantage of existing structure by using an HP EGR passage—which, during engine running, is used for re-circulating exhaust gas from the exhaust passage to an upstream portion of the engine—as a bypass conduit in order to more directly deliver fresh air from upstream of the engine to the particulate filter for regeneration of the particulate filter.

In another example, where EGR passages are closed or EGR systems are omitted, one or more cylinders may be configured to stop combusting with both an intake valve and an exhaust valve open (e.g., valve overlap), such that air can be drawn in through the intake manifold and passed to the particulate filter through the one or more open cylinders to thereby increase excess oxygen to the particulate filter. In such a case, the throttle opening may be adjusted to control excess oxygen flowing through one or more cylinders and to the particulate filter.

As yet another example of increasing excess oxygen to the particulate filter, pressure or vacuum may be generated and stored in the intake manifold, and thereafter be used to push or draw air, respectively, through the particulate filter.

Furthermore, the method 600 may include increasing exhaust heat at 612 in order to bring a particulate filter temperature toward a regeneration reaction temperature. This increasing of exhaust heat may be carried out by adjusting spark timing to be more retarded during one or more last combustions of engine shutdown at 614, for example. Additionally, exhaust heat may be increased by adjusting an air-fuel ratio to be leaner for one or more last combustions, for example. As discussed above, engine speed and load may also be adjusted for one or more last combustions, in order to manipulate exhaust temperature.

Thus, it can be appreciated that excess oxygen levels may be increased immediately after an engine shutdown request by operating lean and/or retarding spark timing, and excess oxygen levels can be maintained at the particulate filter through engine spin-down and after the engine comes to a rest.

The regeneration reaction may be controlled at 616 by adjusting various operating parameters in efforts to control excess oxygen levels and temperature at the particulate filter, as discussed above with respect to FIG. 5. For example, if an oxygen concentration in the exhaust passage is too high (e.g., greater than a high excess oxygen threshold), a throttle opening can be reduced, and if an oxygen concentration at the particulate filter is too low, throttle opening can be increased. Additionally, during a portion of the engine shutdown while the engine is spinning (e.g., during engine spin-down), the HP EGR valve opening can be increased or decreased to respectively increase or decrease an amount of excess oxygen directed to the particulate filter.

Furthermore, if a temperature of the particulate filter becomes too low (e.g., less than a low temperature threshold), efforts to increase an amount of excess oxygen may be carried out. If the temperature becomes too high (e.g., greater than a high temperature threshold), excess oxygen may be decreased to reduce the regeneration reaction rate and/or the airflow may be increased to cool down the particulate filter temperature.

Figure 7:
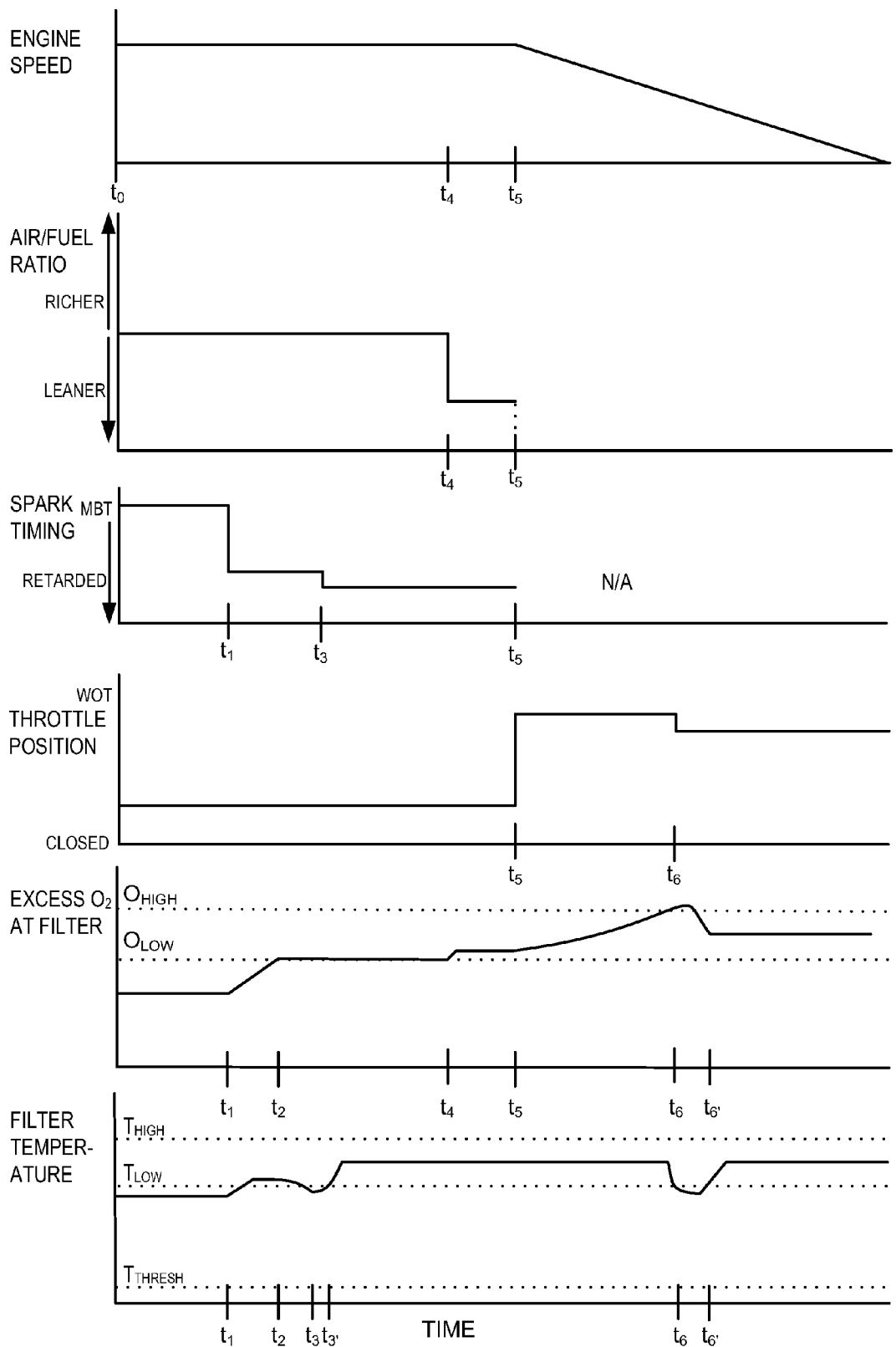
FIG. 7 is an exemplary timeline of several engine parameters during a particulate filter regeneration that begins during engine running and continues during an engine shutdown.
Figure 8:
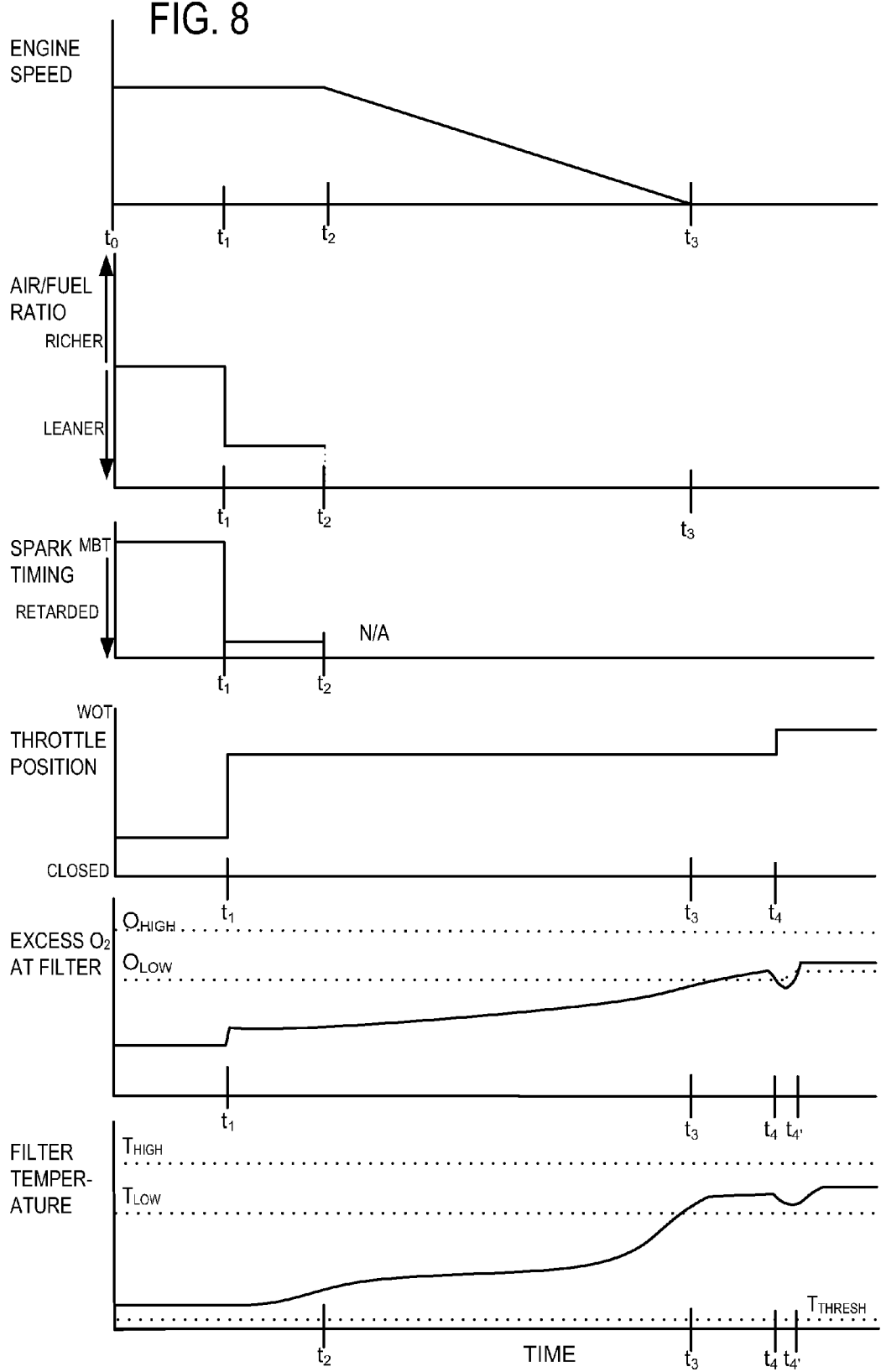
FIG. 8 is an exemplary timeline of several engine parameters for a particulate filter regeneration that is carried out during and after an engine shutdown.

An exemplary timeline of several engine parameters during an engine running regeneration and an engine shutdown regeneration is illustrated in FIG. 7. The example of FIG. 7 can be understood by the methods presented by FIG. 5 and FIG. 6.

At $t_0$, the engine is on and at least one cylinder is combusting (e.g., partial engine combustion). The air-fuel ratio is set about stoichiometry and spark timing is MBT (minimum spark advance for best torque). Throttle position, excess oxygen at the particulate filter, and particulate filter temperature are each at initial respective levels.

At $t_1$, a decision to regenerate the particulate filter during engine running is made, and engine running regeneration is initiated (see FIG. 5). For example, a ram-air flow valve opening may be increased to thereby increase excess oxygen at the particulate filter. This is reflected by an increase in the excess oxygen between $t_1$ and $t_2$. As discussed above, this increase in excess oxygen may be achieved by one or more techniques, or combinations thereof. Additionally, spark timing is retarded at $t_1$ to increase the particulate filter temperature to above minimum temperature $T_{LOW}$ at which a regeneration reaction can be carried out. In this example, a minimum excess oxygen threshold $O_{LOW}$, determined based on the current particulate filter temperature, for a regeneration reaction to occur is met at $t_2$. That is, before engine shutdown conditions are met in this example, the particulate filter may begin regeneration.

At $t_3$, the particulate filter temperature decreases below the low temperature threshold $T_{LOW}$, in one example, due to a low level of oxygen at the particulate filter. For example, the level of excess oxygen $O_{LOW}$, may be insufficient to sustain the regeneration reaction for longer than the period of time between $t_2$ and $t_3$ at a given temperature. As such, spark timing is further retarded at $t_3$ in order to heat the particulate filter. As a result, the particulate filter temperature begins to rise, and eventually exceeds the low temperature threshold $T_{LOW}$ at $t_3'$. After $t_3'$, and until $t_6$, the temperature remains steadily above $T_{LOW}$ and below a high temperature threshold $T_{HIGH}$, where $T_{HIGH}$ may be a temperature above which the regeneration reaction is difficult to sustain and/or control. Also, after $t_3'$ and until $t_4$, the excess oxygen at the particulate filter stays steadily above $O_{LOW}$ and below $O_{HIGH}$. Spark timing, throttle position, and engine speed are unchanged between $t_3'$ and $t_4$, in this example, in order to sustain a desired regeneration reaction rate. However, it may be appreciated that, in other examples, spark timing, throttle position, and/or engine speed may be changed during regeneration based on other demands on the vehicle, and one or more other operating parameters may be complementarily adjusted.

At $t_4$, an engine shutdown request is made (e.g., an operator turns off an ignition switch). In response, the air-fuel ratio is made leaner in order to increase excess oxygen at the particulate filter. As a result, the excess oxygen at the filter increases at $t_4$. Although not shown, the temperature may be affected by such an increase in excess oxygen at the particulate filter. However, the temperature may be unaffected. Furthermore, although not shown, spark timing may be further retarded after an engine shutdown request is made, if it is desirable to increase heat to the particulate filter. In this example of FIG. 7, spark timing is already retarded at $t_4$, and a regeneration reaction temperature is already achieved, so the spark retard is simply maintained.

At $t_5$, engine combustion stops and engine spin-down begins, as indicated by the air-fuel ratio becoming infinitely lean, and the cessation of spark timing. Here, the regenerating is continued from regeneration during engine combustion to regeneration during non-combusting, by increasing the throttle opening to maintain and/or increase excess oxygen at the particulate filter, even though the engine speed is decreasing. One or more charge motion control valves (CMCVs) may also be opened to increase excess oxygen at the particulate filter. After $t_5$, the excess oxygen increases, at least in part due to the increased throttle opening and the spinning of the engine.

At $t_6$, the excess oxygen at the filter exceeds $O_{HIGH}$, thereby causing a cooling of the filter temperature below $T_{LOW}$. In response, the throttle opening is reduced, and the engine speed continues to decrease, thus resulting in a decrease in excess oxygen at the filter, and an increase in filter temperature as the regeneration reaction rate increases at $t_6'$. Additionally or alternatively, if an HP EGR valve is open at $t_6$, and air is bypassing the engine via the HP EGR circuit to be directed to the particulate filter during engine spin-down, the HP EGR valve opening may be reduced at $t_6$ to reduce the flow of air through the EGR conduit. It is notable that temperature is also affected (e.g., reduced) by the increase in oxygen at $t_6$.

A regeneration reaction may continue even after the engine spins down, as the regeneration reaction is exothermic, and air (e.g., excess oxygen) may continue to passively reach the particulate filter via a ram-air flow valve opening and/or through one or more open cylinders of the engine (e.g., a cylinder having valve overlap).

From the examples provided, it can be understood that the increasing of excess oxygen to the particulate filter may be carried out while a temperature of the particulate filter is within a prescribed temperature range (e.g., between $T_{THRESH}$ or $T_{THRESH2}$ and $T_{HIGH}$).

Turning now to FIG. 8, a second exemplary timeline of several operating parameters during a particulate filter regeneration that begins during an engine shutdown is shown. At $t_0$ of FIG. 8, the engine is combusting, an air-fuel ratio is set about stoichiometric, and spark timing is MBT (minimum spark advance for best torque). Throttle position, excess oxygen, or oxygen concentration at the filter, and filter temperature are at initial respective levels.

At $t_1$, an engine shutdown request is made, and the engine shutdown regeneration flag has been set to be equal to one. As such, a particulate filter regeneration is to be carried out during engine shutdown. Accordingly, at $t_1$, the air-fuel ratio is set to be lean, spark timing is nominally retarded during one or more last combustions, and the throttle opening is increased. Accordingly, the excess oxygen increases sharply, and then gradually along with the increase in filter temperature after $t_1$.

At $t_2$, the engine stops combusting, and engine spin-down begins. Between $t_2$ and $t_3$, the engine spins down while the throttle position remains open, to gradually increase the concentration of oxygen directed to the particulate filter. The particulate filter temperature gradually increases upon engine shutdown.

At $t_3$, the engine speed reduces to zero and the engine is at rest. Also at $t_3$, the excess oxygen at the particulate filter exceeds $O_{LOW}$ and the filter temperature exceeds $T_{LOW}$, thus placing the particulate filter under conditions for a regeneration reaction to occur at a predetermined rate. The regeneration reaction ensues until $t_4$, where the reaction ceases to sustain at the predetermined rate, and the excess oxygen level at the filter decreases to below $O_{LOW}$. The temperature also decreases. As a result, the low excess oxygen threshold $O_{LOW}$ for resuming the regeneration reaction at the predetermined rate increases (as indicated by the increase of dotted line $O_{LOW}$), at least in part due to the decrease in particulate filter temperature.

In response to the low excess oxygen at the particulate filter, the throttle position is further increased at $t_4$. As a result, the excess oxygen level increases to above the new low excess oxygen threshold $O_{LOW}$ at $t_4'$, and the regeneration reaction resumes at the predetermined regeneration reaction rate.

Thus, in this example, the increasing of excess oxygen to the particulate filter occurs during one or more last combustions and during engine spin-down, and the actual regeneration reaction occurs at a substantial rate after the engine spins down to rest, and continues during engine rest. Eventually, the regeneration reaction may complete and the regeneration reaction will cease due to inadequate particulate at the particulate filter. Alternately, the regeneration reaction may be stopped due to a decrease in excess oxygen and/or a decrease in particulate filter temperature at some time during engine rest.

In general, a desired excess oxygen range (e.g., range between $O_{LOW}$ and $O_{HIGH}$) may change based on a current particulate filter temperature or based on a desired particulate filter temperature range. For example, if temperature of the particulate filter decreases from a nominal particulate filter temperature, during a regeneration reaction, a high excess oxygen threshold may decrease. On the other hand, if the particulate filter temperature increases from a nominal particulate filter temperature during a regeneration reaction, a low excess oxygen threshold may increase. That is, a low excess oxygen threshold and a high excess oxygen threshold may be dynamic, and may be based on a nominal particulate filter temperature and a nominal amount of excess oxygen at a particulate filter, as well as an amount of particulate stored at the particulate filter.

Particular considerations, and advantages, may be taken into account when performing regeneration of the particulate filter in an HEV, where an engine can be made to be partially or fully non-combusting with increased frequency and/or with more flexibility compared to a conventional combustion engine. For example, engine shutdown regeneration can be carried out while an energy conversion device, such as a motor, provides power to the engine, transmission, and/or drivewheel. As such, methods for controlling a regeneration of a particulate filter in a hybrid electric vehicle (HEV) are specifically described with respect to FIG. 9 and FIG. 10, and two example timelines involving particulate filter regeneration in an HEV are shown in FIG. 11 and FIG. 12. However, the methods described above, and the examples presented above, may also be applied for regeneration of a particulate filter in an HEV.

Turning to the method 900 of FIG. 9, it is determined if engine shutdown conditions are met at 902. Engine shutdown conditions may include a battery state of charge (SOC) above a predetermined charge level, as one example. The predetermined charge level may include an amount of charge sufficient for powering an engine, transmission, and/or drive-wheel for a predetermined amount of time. Engine shutdown conditions may also include an engine speed, engine load and/or vehicle speed demand being below a respective threshold. That is, the engine shutdown conditions may be met at 902 if the engine speed, engine load and/or vehicle speed are low enough that an energy conversion device can maintain the engine speed, engine load and/or vehicle speed. In another example, engine shutdown conditions may be met more or less frequently based on fuel economy objectives of the engine. Furthermore, engine shutdown conditions may be met in some HEVs simply if it is desirable to perform a particulate filter regeneration during engine shutdown (e.g., even if other conditions deem particulate filter regeneration undesirable).

If the answer is no at 902, the method 900 proceeds to 904 where it is determined if the engine running regeneration flag is equal to one. If the answer is no, the method 900 may terminate. If the answer is yes at 904, the method may proceed to 906, where the particulate filter regeneration may be carried out during engine running. Reader is referred to the description of method 500 of FIG. 5 for controlling particulate filter regeneration during engine running.

Additionally, particulate filter regeneration during engine running in an HEV may be carried out during combustion of one or more cylinders, and one or more remaining non-combusting cylinders may be powered by an energy conversion device. That is, during an "engine running" regeneration in an HEV, one or more cylinders may not be combusting, in order to conserve fuel. In such an example, the air-fuel ratio of one or more combusting cylinders may be set to be rich such that the overall air-fuel ratio in the exhaust is stoichiometric, and the air-fuel ratio in one or more combusting cylinders may be adjusted based on emissions from the three-way catalyst. Additionally or alternatively, in an HEV, particulate filter regeneration during engine running may include selectively adjusting engine speed in the non-combusting cylinders to increase or decrease excess oxygen directed to the particulate filter.

Returning to FIG. 9, if the answer is yes at 902, the method 900 proceeds to 908, where it is determined if the engine shutdown regeneration flag is equal to one. If the answer is no at 908, the method may proceed to 910, where an engine shutdown without active particulate filter regeneration is carried out, as described above with respect to FIG. 4. Specifically, an engine shutdown at 910 may include setting the air-fuel ratio to about stoichiometric for one or more last combustions at 912, and reducing a throttle opening at 914 in order to reduce excess oxygen at the particulate filter. However, if an engine running regeneration is already being carried out at 908 and the answer is no at 908, the method may proceed to 916 in order to continue the regeneration, in some examples.

If the answer is yes at 908, the method 900 proceeds to 916, where it is determined if a particulate filter temperature is greater than a second baseline threshold temperature $T_{THRESH2}$. $T_{THRESH2}$ may be a threshold temperature that is lower than $T_{THRESH}$ of FIG. 4 (e.g., $T_{THRESH}$ may be associated with controls for an engine in a conventional engine), because the temperature of a particulate filter in an HEV may be increased by a greater amount than a temperature of a particulate filter in a conventional combustion engine, in a same amount of time after an engine shutdown request. If the answer is no at 916, method 900 may proceed to 910. In some cases, the method 900 may proceed to 910, particularly if a regeneration of the particulate filter was not already occurring before engine shutdown conditions were met at 902.

On the other hand, if the answer is yes at 916, a particulate filter regeneration is carried out during an engine shutdown and/or after an engine shutdown, as indicated at 918. In some cases, this may include continuing a particulate filter regeneration that is being carried out before engine shutdown conditions were met at 902. Particulate filter regeneration during an engine shutdown in an HEV is described in detail with respect to method 1000 of FIG. 10.

FIG. 10 is a flowchart illustrating a method 1000 including increasing excess oxygen to the particulate filter during an engine shutdown in an HEV at 1002. This may include setting the air-fuel ratio to be lean in at least one cylinder for one or more last combustions at 1004, and/or increasing a throttle opening and/or charge motion control valve at 1006. Further, increasing excess oxygen at the particulate filter may include increasing a ram-air flow valve opening at 1008 if the vehicle is moving. Additionally, engine speed (e.g., engine spinning speed) can be controlled (e.g., increased, or maintained) during non-combusting engine conditions, via a motor or other energy conversion device at 1010, in order to increase excess oxygen flowing to the particulate filter. By controlling engine speed of non-combusting cylinders with a motor, fresh air can be introduced to the engine, and passed through to the particulate filter while the engine spins but does not combust. In some cases, this may include increasing the engine speed.

Thus, an HEV has increased flexibility over a conventional engine for controlling a regeneration of the particulate filter during engine shutdown because of the additional controllable parameter of engine speed (e.g., via a motor) during non-combusting engine conditions. In some examples, such as when it is desirable to conserve energy, a throttle opening may simply be adjusted to adjust excess oxygen at the particulate filter in an HEV during a particulate filter regeneration and engine speed may not be adjusted. In other examples, engine speed may be adjusted via a motor to adjust excess oxygen at the particulate filter in an HEV. In yet further examples, a combination of throttle opening and engine speed may be used to control excess oxygen levels at a particulate filter during particulate filter regeneration, where a greater throttle opening can compensate for a lower engine speed, and vice versa.

Further, it may be desirable to adjust engine speed to control excess oxygen at the particulate filter while regenerating a particulate filter when the vehicle is not in motion. In contrast, if the vehicle is in motion, it may be desirable to increase excess oxygen directed to the particulate filter by adjusting other parameters (e.g., by adjusting a ram-air flow valve in a ram-air conduit).

At 1012, method 1000 may include closing the intake and exhaust valves of the cylinders, opening the throttle, closing the EGR wastegate, and opening a HP EGR valve, if engine combusting has stopped and a compressor is still spinning. By carrying out these controls, excess oxygen delivered to the particulate filter can be increased. Specifically, fresh air is drawn in through the intake manifold, bypasses the engine via the HP EGR circuit, and is delivered immediately upstream of the three-way catalyst (as shown in FIG. 1) or immediately upstream of the particulate filter, in other examples.

At 1014, the method 1000 may include increasing exhaust heat. This may be accomplished by retarding spark timing of at least one cylinder during one or more last combustions at 1016. Exhaust heat may also be increased by increasing engine speed during engine combusting conditions, in some examples.

Another method for engine shutdown regeneration in an HEV includes spinning the engine down to rest, and waiting for a particulate filter temperature to become sufficiently high after stopping combusting. When the particulate filter temperature has exceeded a low temperature threshold, a motor of the HEV may be engaged to at least control spinning of the engine to increase excess oxygen directed to the particulate filter, and the throttle opening may, in some cases, also be increased to increase excess oxygen. In this way, a natural increase in particulate filter temperature upon engine shutdown is taken advantage of, and controls for increasing the particulate filter temperature can be omitted. In such an example, the regeneration reaction is carried out at least during engine rest.

At 1018, excess oxygen levels and temperature at the particulate filter can be controlled during the regeneration reaction by adjusting various operating parameters, as discussed with respect to FIG. 5 and FIG. 6. These operating parameters may include a throttle opening, an air-fuel ratio, an amount of fresh ram-air supplied in the exhaust, an HP EGR valve opening, air-fuel ratio, and spark timing, as just some examples. Furthermore, in an HEV, engine speed can be adjusted by an energy conversion device to control excess oxygen levels and particulate filter temperature. As discussed above, engine speed may be adjusted under some conditions in an HEV (e.g., during vehicle motion) and other parameters may be adjusted under other conditions in an HEV (e.g., during engine idling).

The adjusting of engine speed may be based on an exhaust gas oxygen sensor and/or an exhaust temperature sensor. The exhaust gas oxygen sensor and/or exhaust temperature sensor may provide an indication of a regeneration reaction rate, and as such, the excess oxygen directed to the particulate filter by engine spinning may be adjusted to control the regeneration rate. Accordingly, the amount of excess oxygen directed to the particulate filter by engine spinning may be further based on an amount of particulate at the particulate filter.

Turning now to FIG. 11, an exemplary timeline of several operating parameters during engine running regeneration, and during a continuation of regeneration during engine shutdown in a hybrid electric vehicle, is illustrated. At $t_0$, the engine is combusting, excess oxygen at the particulate filter is low, and particulate filter temperature is low, such that a regeneration reaction is not occurring. However, the temperature is greater than $T_{THRESH2}$ at $t_0$.

At $t_1$, a decision to perform engine running particulate filter regeneration is made. Accordingly, spark timing is nominally retarded to heat up the particulate filter. In a hybrid electric vehicle, spark timing of one or more cylinders may be maximally, or near-maximally, retarded such that the retarded cylinder(s) are generating negligible torque and large amounts of heat, and an energy conversion device can be used to provide desired engine torque. As such, the spark timing may be more retarded during engine running regeneration in a hybrid electric vehicle than in engine running regeneration in a non-hybrid electric vehicle. Accordingly, a temperature threshold $T_{THRESH2}$ referred to at 916 of method 900 may be lower than the temperature threshold $T_{THRESH}$ referred to at 416 of method 400, because more exhaust heating may be carried out by retarding a spark timing in an HEV than in a non-HEV.

Turning back to FIG. 11, at $t_1$, the vehicle may be moving and a ram-air flow valve opening may be increased. As a result, fresh ram-air may be introduced upstream of the particulate filter, and excess oxygen at the particulate filter increases after $t_1$. At $t_2$, particulate filter temperature is within a range suitable for carrying out a regeneration reaction, and the excess oxygen is above $O_{LOW}$, a low excess oxygen threshold for carrying out the regeneration reaction. As a result, the regeneration reaction begins at a predetermined rate.

At $t_3$, engine shutdown conditions are met (e.g., battery SOC is high, engine speed and engine load are low), and an engine shutdown regeneration flag is set equal to one. In response, the air-fuel ratio is made lean at $t_3$ to increase excess oxygen at the particulate filter. In this example, because ram-air is being directed to the particulate filter at a sufficient rate to maintain excess oxygen above $O_{LOW}$ at the particulate filter, an opening of the throttle is not increased at $t_3$. However, the throttle opening may be increased at any point after $t_1$, in other examples. Furthermore, at $t_3$, spark timing is maintained retarded in order to assist in the maintenance of the particulate filter temperature above $T_{LOW}$.

At $t_4$, engine combustion stops, as indicated by the absence of an air-fuel ratio and cessation of spark timing after $t_4$. The engine speed is reduced to a new engine speed, which may be maintained by an energy conversion device (e.g., motor) in the hybrid electric vehicle. In order to counteract a potential reduction in excess oxygen caused by the decreased engine speed, throttle opening is increased at $t_4$, to wide-open throttle (WOT). As a result, a level of excess oxygen at $t_4$ is maintained, even though the engine speed is reduced.

At $t_5$, excess oxygen increases above $O_{HIGH}$ and, as a result, the filter temperature decreases as the regeneration reaction rate decreases. In response to the increase in excess oxygen and/or decrease in filter temperature, the engine speed is reduced at $t_5$ to thereby reduce excess oxygen flowing to the particulate filter. This has the result of returning the excess oxygen level at the particulate filter back into a desired range (e.g., below high excess oxygen threshold $O_{HIGH}$) at $t_5'$, thereby increasing the regeneration reaction rate and returning the filter temperature to the desired temperature range (e.g., above low temperature threshold $T_{LOW}$). After $t_5'$, the regeneration reaction may proceed at the predetermined rate.

FIG. 12 illustrates a second exemplary timeline of various engine parameters during a particulate filter regeneration that is initiated during an engine shutdown in an HEV. At $t_0$, the engine is combusting, the air-fuel ratio is about stoichiometric and spark timing is MBT. A decision to perform engine shutdown, based on engine shutdown conditions being met, is made at $t_1$. Here, an engine running regeneration was not being performed prior to engine shutdown conditions being met at $t_1$.

In order to increase excess oxygen flowing to the particulate filter, an air-fuel ratio is made lean for one or more last combustions and throttle opening is also increased at $t_1$. Accordingly, excess oxygen at the particulate filter increases after $t_1$. Further, at $t_1$, spark timing is retarded for one or more last combustions in order to increase exhaust heat directed at the particulate filter. This is reflected by the increase in filter temperature between $t_1$ and $t_2$.

At $t_2$, the engine may stop combusting, and an energy conversion device coupled to the engine in the HEV may maintain the engine speed. As a result, the increase in excess oxygen at the particulate filter may begin to level off after $t_2$.

At $t_3$, the particulate filter temperature is within a desired temperature range, and the excess oxygen at the particulate filter is within a desired excess oxygen range. The regeneration reaction may begin at a predetermined rate.

At $t_4$, the particulate filter temperature increases above a high temperature threshold $T_{HIGH}$. In response, the throttle opening is decreased and the engine speed is reduced at $t_4$. Thereafter, particulate filter temperature decreases due to the decrease in excess oxygen at the particulate filter. In other words, a reduction in excess oxygen may lead to a reduction in the regeneration reaction rate, thus causing a decrease in particulate filter temperature. The regeneration reaction may continue until the particulate filter temperature decreases below $T_{LOW}$, the excess oxygen decreases below $O_{LOW}$, and/or until the regeneration reaction is substantially complete (e.g., there is a low amount of particulate on the particulate filter), as long as the regeneration reaction is sustained by appropriate control of the various operating parameters discussed.

It may be appreciated that, although feedback control of excess oxygen, particulate filter temperature, regeneration reaction rate, etc. has been shown in several exemplary timelines herein, feedforward or predictive control may also be implemented.

Turning now to FIG. 13, a flowchart illustrating a method 1300 for starting an engine is provided. Specifically, at 1302, it is determined if start conditions are met. This may include, at least in a non-HEV, an operator request to start, or operator tip-in after a deceleration fuel shut-off. In an HEV, start conditions may further include an engine speed or engine load above a predetermined threshold (e.g., where a motor cannot provide sufficient torque). If the answer is no at 1302, the method 1300 may terminate.

However, if the answer is yes at 1302, the method 1300 includes estimating an amount of stored oxygen at a three-way catalyst at 1304. This estimating may include determining a backpressure in the exhaust, detected at 1306. Further, the estimating may include determining at 1308 if a regeneration was performed at last engine shutdown and, if so, the duration of the last regeneration, at 1310.

A last engine shutdown may be an engine shutdown performed before the current time, without any intervening engine shutdowns, such that it is an engine shutdown closest in time to the engine start. The method 1300 considers whether or not a regeneration was carried out during the last engine shutdown, in order to account for differences in stored oxygen at the three-way catalyst during engine start. Differences in stored oxygen at the three-way catalyst may be due to differences of excess oxygen flow or excess oxygen flow rate during a particulate filter regeneration during engine shutdown.

Accordingly, if an amount of stored oxygen at the three-way catalyst is not greater than a threshold amount (e.g., a particulate filter regeneration was not performed on a last engine shutdown) as determined at 1312, the method 1300 includes setting the air-fuel ratio to about stoichiometric, or to be lean, during an engine start at 1314. The method 1300 may also include setting one or more other engine operating parameters (e.g., advancing spark timing, injection timing, and/or adjusting idle set point speed, etc.) based on the particulate filter not having been regenerated on a last engine shutdown. For example, an idle set point speed may be set to be lower than an idle set point speed for an engine start after no particulate filter regeneration.

At 1316, the method 1300 may include further adjusting one or more engine parameters such as air-fuel ratio, spark timing, etc., based on a temperature of the three-way catalyst while performing the engine start.

In this exemplary method, if it is determined that the amount of stored oxygen at the three-way catalyst is greater than the threshold amount at 1312 (e.g., a regeneration was performed on the last engine shutdown), the method 1300 includes setting the air-fuel ratio to be rich during the engine start at 1318. By operating rich during the engine start, unburned fuel can be oxidized by the stored oxygen on the three-way catalyst during the start, thus reducing a potential release of NOx to the atmosphere. The method 1300 may also include setting, at 1318, one or more other engine operating parameters (e.g., retarding spark timing, injection timing, and/or adjusting idle start point, etc.) based on the particulate filter having been regenerated on a last engine shutdown.

At 1320, the method 1300 may include further adjusting engine parameters, such as air-fuel ratio, spark timing, injection timing and/or throttle opening, based on the amount of stored oxygen on the three-way catalyst and a three-way catalyst temperature, with an objective of reducing emissions during the engine start. For example, spark timing may be retarded if there is a threshold amount of oxygen stored at the three-way catalyst. In this way, unburned hydrocarbons may react with and substantially consume the excess oxygen stored at the three-way catalyst. In other words, during an engine start following an engine shutdown, the method may include setting one or more engine parameters based on whether the particulate filter was regenerated during a last engine shutdown before the engine start.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling regeneration of a particulate filter positioned downstream of an engine coupled to an energy conversion device in a vehicle, comprising:
 during first engine shutdown conditions with filter regeneration:
  increasing excess oxygen to the particulate filter by spinning the engine with the energy conversion device, and
  regenerating the particulate filter; and
 during second engine shutdown conditions without filter regeneration:
  decreasing the excess oxygen to the particulate filter.

2. The method of claim 1, where first engine shutdown conditions include an amount of stored particulate at the particulate filter at a last combustion that is greater than an amount of stored particulate at the particulate filter at a last combustion during second engine shutdown conditions.

3. A method for controlling regeneration of a particulate filter positioned downstream of an engine coupled to an energy conversion device in a vehicle, comprising:
 during first engine shutdown conditions with filter regeneration:
  increasing excess oxygen to the particulate filter by spinning the engine with the energy conversion device, and
  regenerating the particulate filter; and
 during second engine shutdown conditions without filter regeneration:
  decreasing the excess oxygen to the particulate filter,
 where the increasing of excess oxygen to the particulate filter includes increasing a throttle opening of a throttle positioned upstream of the engine, and where the decreasing of the excess oxygen includes reducing the throttle opening, wherein fresh air is introduced to the engine, and passed through to the particulate filter while the engine spins but does not combust.

4. The method of claim 1, where, during first engine shutdown conditions, the increasing of excess oxygen to the particulate filter is carried out while a temperature of the particulate filter is within a prescribed temperature range.

5. The method of claim 1, where during first engine shutdown conditions, the increasing of excess oxygen to the particulate filter occurs during engine spin-down, and a regeneration reaction occurs at least partially during engine rest.

6. The method of claim 1, further comprising regenerating the particulate filter before first engine shutdown conditions are met, where the regenerating during the first engine shutdown conditions includes continuing the regenerating.

7. The method of claim 6, where before first engine shutdown conditions are met, the regenerating includes directing excess oxygen to a position upstream of the particulate filter and downstream of a three-way catalyst.

8. The method of claim 1, further comprising, during first engine shutdown conditions, adjusting engine speed based on an exhaust gas oxygen sensor and/or an exhaust temperature sensor.

9. The method of claim 1, further comprising, during first engine shutdown conditions, adjusting engine spinning speed based on an amount of particulate at the particulate filter.

10. The method of claim 1, where a regeneration of the particulate filter is not occurring before the second engine shutdown conditions are met, and where a particulate filter regeneration is not carried out during the second engine shutdown conditions.

11. A method for controlling regeneration of a particulate filter downstream of an engine coupled to an energy conversion device, comprising:
 during first conditions, stopping combustion and regenerating the particulate filter by adjusting engine speed; and
 during second conditions, stopping combustion and regenerating the particulate filter by adjusting an EGR valve.

12. The method of claim 11, where second conditions include vehicle motion, and where the particulate filter is regenerated by further adjusting a ram-air valve in a ram-air conduit.

13. A system for controlling a regeneration of a particulate filter, the system comprising:
 an engine having a plurality of cylinders;
 a particulate filter positioned downstream of the engine;
 a three-way catalyst positioned upstream or downstream of the particulate filter;
 an oxygen sensor in an exhaust conduit; and
 an electronic controller including a computer-readable storage medium with instructions to:
  adjust an energy conversion device to at least partially drive the engine,
  regenerate the filter by adjusting an operating parameter to deliver excess oxygen from the engine to the particulate filter,
  deliver excess oxygen to the particulate filter by adjusting an air-fuel ratio in one or more combusting cylinders, and
  adjust an amount of excess oxygen based on feedback from the oxygen sensor.

14. The system of claim 13, where the electronic controller has instructions to deliver excess oxygen by increasing one or more of a throttle opening and an engine speed.

15. The system of claim 13, further comprising a temperature sensor in the exhaust conduit, where the electronic controller has instructions to adjust the amount of excess oxygen based on feedback from the temperature sensor.

16. A method for controlling particulate filter regeneration with an engine coupled to a propulsion system motor, comprising:
 during stopped vehicle conditions, stopping combustion and regenerating the particulate filter by adjusting engine speed via the propulsion system motor; and
 during moving vehicle conditions, stopping combustion and regenerating the particulate filter by adjusting a ram-air valve.

* * * * *